United States Patent
Matsumoto et al.

(10) Patent No.: US 6,443,635 B1
(45) Date of Patent: Sep. 3, 2002

(54) ELECTROMAGNETIC ACTUATOR WITH AUTO-RETAINING OF ROTOR AT TRIPLE POSITIONS

(75) Inventors: Junichi Matsumoto; Kouichi Kobayashi, both of Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 09/711,883

(22) Filed: Nov. 15, 2000

(30) Foreign Application Priority Data

Nov. 16, 1999 (JP) .......................................... 11-325577
Nov. 16, 1999 (JP) .......................................... 11-325578

(51) Int. Cl.[7] .......................... G03B 9/08; G03B 9/02; H02K 7/00
(52) U.S. Cl. ...................... 396/463; 396/470; 396/508; 310/17
(58) Field of Search ................................ 396/463, 470, 396/508; 310/17

(56) References Cited

U.S. PATENT DOCUMENTS

| 4,760,420 A | * | 7/1988 | Lam | 396/470 |
| 5,255,037 A | | 10/1993 | Kobayashi | 396/459 |
| 5,446,514 A | * | 8/1995 | Matsumoto | 396/463 |
| 5,489,959 A | * | 2/1996 | Akada | 396/508 |
| 5,608,484 A | * | 3/1997 | Furlani et al. | 396/463 |
| 6,215,207 B1 | * | 4/2001 | Kondo et al. | 310/36 |

FOREIGN PATENT DOCUMENTS

| JP | 8-146488 | 6/1996 |
| JP | 9-020731 | 2/1997 |
| JP | 9-139884 | 5/1997 |

* cited by examiner

*Primary Examiner*—Christopher Mahoney
(74) *Attorney, Agent, or Firm*—Nixon Peabody LLP; Thomas W. Cole

(57) ABSTRACT

In an electromagnetic actuator, a rotor composed of a permanent magnet is mounted rotatably in two directions between a first end position and a second end position via an intermediate position. A coil is wound around the rotor to rotate the rotor in an energizing state where an electric current is applied to the coil. An auto-retaining device is provided for retaining the rotor at one of the intermediate position, the first end position and the second end position under a non-energizing state where the electric current is not applied to the coil. The auto-retaining device has an elastic member that regulates the rotor at the intermediate position by a mechanical elastic force, a first magnetic member that is opposed to the permanent magnet and that retains the rotor at the first end position by a magnetic attractive force, and a second magnetic member that is opposed to the permanent magnet and that retains the rotor at the second end position by a magnetic attractive force.

15 Claims, 23 Drawing Sheets

ELECTROMAGNETIC ACTUATOR WITH
AUTO-RETAINING OF ROTOR AT TRIPLE
POSITIONS

BACKGROUND OF THE INVENTION (i) Field of the Invention

The present invention relates to a shutter apparatus and a diaphragm apparatus incorporated in a digital camera or else. More particularly, the present invention relates to an electromagnetic actuator used as a drive source for the shutter apparatus or the diaphragm apparatus.

(ii) Description of the Related Art

When taking a photograph of an object by using a camera, a combination of an aperture diameter of a lens and a shutter time should be optimized in accordance with exposure circumstances. For such a camera, there has been a system for separately providing a diaphragm mechanism for regulating a diameter of a lens aperture, and a shutter mechanism for opening and closing the lens aperture such that these mechanisms are individually controlled. Further, in such a diaphragm mechanism, it is general to regulate a diameter of the lens aperture in two stages.

However, each of the diaphragm mechanism and the shutter mechanism requires an electromagnetic actuator, and there is a serious restriction in the cost and the space efficiency. In addition, a system capable of setting the aperture in triple or more stages is desired in the diaphragm mechanism.

SUMMARY OF THE INVENTION

In view of the above-described problems in the prior art, it is therefore an object of the present invention is to provide a shutter apparatus which can provide both of the shutter mechanism and the diaphragm mechanism. Further, it is another object of the present invention to provide a diaphragm apparatus capable of controlling an aperture in multiple stages. It is yet another object of the present invention to provide an electromagnetic actuator suitable as a drive source for the shutter apparatus and the diaphragm apparatus.

In a first aspect of the invention, an electromagnetic actuator comprises a rotor that is comprised of a permanent magnet and that is rotatable in two directions between a first end position and a second end position via an intermediate position, a coil that is wound around the rotor and that rotates the rotor in an energizing state where an electric current is applied to the coil, and auto-retaining means for retaining the rotor at one of the intermediate position, the first end position and the second end position under a non-energizing state where the electric current is not applied to the coil, wherein the auto-retaining means comprises an elastic member that regulates the rotor at the intermediate position by a mechanical elastic force, a first magnetic member that is opposed to the permanent magnet and that retains the rotor at the first end position by a magnetic attractive force, and a second magnetic member that is opposed to the permanent magnet and that retains the rotor at the second end position by a magnetic attractive force. Preferably, the auto-retaining means is designed such that the mechanical elastic force overcomes the magnetic attractive force so as to regulate the rotor at the intermediate position when the coil is switched from the energizing state to the non-energizing state while the rotor travels toward the intermediate position, further the auto-retaining means is designed such that the magnetic attractive force overcomes the mechanical elastic force so as to retain the rotor at the first end position when the coil is switched from the energizing state to the non-energizing state while the rotor travels toward the first end position, and the auto-retaining means is designed such that the magnetic attractive force overcomes the mechanical elastic force so as to retain the rotor at the second end position when the coil is switched from the energizing state to the non-energizing state while the rotor travels toward the second end position. Preferably, the coil is provided such that an amount of the electric current required for driving the rotor from the intermediate position to either of the first end position and the second end position is greater than another amount of the electric current required for driving the rotor from either of the first end position and the second end position to the intermediate position.

Further, an inventive shutter apparatus comprises a shutter blade that is arranged on a substrate having a lens aperture and that opens and closes the lens aperture, and an electromagnetic actuator that is engaged with the shutter blade and that drives the shutter blade to open and close the lens aperture, wherein the electromagnetic actuator comprises a rotor that is composed of a permanent magnet and that is rotatable in two directions between a first end position and a second end position via an intermediate position, a coil that is wound around the rotor and that rotates the rotor in an energizing state where an electric current is applied to the coil, and auto-retaining means for retaining the rotor at one of three positions selected from the intermediate position, the first end position and the second end position under a non-energizing state where the electric current is not applied to the coil, the auto-retaining means comprising an elastic member that regulates the rotor at the intermediate position by a mechanical elastic force, a first magnetic member that is opposed to the permanent magnet and that retains the rotor at the first end position by a magnetic attractive force, and a second magnetic member that is opposed to the permanent magnet and that retains the rotor at the second end position by a magnetic attractive force, and wherein the shutter blade is driven to one of three positions selected from a full opening position for opening the lens aperture, a full closing position for closing the lens aperture, and a half opening position for partially opening the lens aperture, the three positions of the shutter blade corresponding to the three positions of the rotor. Preferably, the shutter blade is selectively driven to one of the full opening position in correspondence to the first end position of the rotor, the full closing position in correspondence to the intermediate position of the rotor, and the half opening position in correspondence to the second end position of the rotor. Preferably, the shutter blade is selectively driven to one of the full opening position in correspondence to the first end position of the rotor, the half opening position in correspondence to the intermediate position of the rotor, and the full closing position in correspondence to the second end position of the rotor.

Still further, an inventive diaphragm apparatus comprises a diaphragm blade that is arranged on a substrate having a lens aperture and that regulates a diameter of the lens aperture, and an electromagnetic actuator that is engaged with the diaphragm blade to drive the diaphragm blade, wherein the electromagnetic actuator comprises a rotor that is composed of a permanent magnet and that is rotatable in two directions between a first end position and a second end position via an intermediate position, a coil that is wound around the rotor and that rotates the rotor in an energizing state where an electric current is applied to the coil, and auto-retaining means for retaining the rotor at one of three positions selected from the intermediate position, the first end position and the second end position under a non-energizing state where the electric current is not applied to the coil, the auto-retaining means comprising an elastic member that regulates the rotor at the intermediate position by a mechanical elastic force, a first magnetic member that is opposed to the permanent magnet and that retains the rotor at the first end position by a magnetic attractive force, and a second magnetic member that is opposed to the permanent magnet and that retains the rotor at the second end position by a magnetic attractive force, and wherein the diaphragm blade is driven selectively to three positions for setting the lens aperture in a large diameter, a medium diameter and a small diameter, respectively, the three positions of the diaphragm blade corresponding to the three positions of the rotor.

In a second aspect of the invention, an electromagnetic actuator comprises a rotor that is magnetized in two poles and that is rotatable in two directions between a first end position and a second end position via an intermediate position, a yoke that has a horseshoe-like shape and that is arranged relative to the rotor such that a magnetic attractive force is created when the rotor comes to either of the first end position and the second end position, a coil that is wound around the yoke and that rotates the rotor in an energizing state where an electric current is applied to the coil, and auto-retaining means for retaining the rotor at one of the intermediate position, the first end position and the second end position under a non-energizing state where the electric current is not applied to the coil, wherein the auto-retaining means comprises an elastic member that regulates the rotor at the intermediate position by a mechanical elastic force, a first stopper member that arrests the rotor at the first end position by utilizing the magnetic attractive force created between the rotor and the yoke, and a second stopper member that arrests the rotor at the second end position by utilizing the magnetic attractive force created between the rotor and the yoke. Preferably, the auto-retaining means is designed such that the mechanical elastic force overcomes the magnetic attractive force so as to regulate the rotor at the intermediate position when the coil is switched from the energizing state to the non-energizing state while the rotor travels toward the intermediate position, further the auto-retaining means is designed such that the magnetic attractive force overcomes the mechanical elastic force so as to arrest the rotor at the first end position when the coil is switched from the energizing state to the non-energizing state while the rotor travels toward the first end position, and the auto-retaining means is designed such that the magnetic attractive force overcomes the mechanical elastic force so as to arrest the rotor at the second end position when the coil is switched from the energizing state to the non-energizing state while the rotor travels toward the second end position. Preferably, the coil is provided such that an amount of the electric current required for driving the rotor from the intermediate position to either of the first end position and the second end position is greater than another amount of the electric current required for driving the rotor from either of the first end position and the second end position to the intermediate position.

Further, an inventive shutter apparatus comprises a shutter blade that is arranged on a substrate having a lens aperture and that opens and closes the lens aperture, and an electromagnetic actuator that is engaged with the shutter blade and that drives the shutter blade to open and close the lens aperture, wherein the electromagnetic actuator comprises a rotor that is magnetized in two poles and that is rotatable in two directions between a first end position and a second end position via an intermediate position, a yoke that has a horseshoe-like shape and that is arranged relative to the rotor such that a magnetic attractive force is created when the rotor comes to either of the first end position and the second end position, a coil that is wound around the yoke and that rotates the rotor in an energizing state where an electric current is applied to the coil, and auto-retaining means for retaining the rotor at one of three positions selected from the intermediate position, the first end position and the second end position under a non-energizing state where the electric current is not applied to the coil, the auto-retaining means comprising an elastic member that regulates the rotor at the intermediate position by a mechanical elastic force, a first stopper member that arrests the rotor at the first end position by utilizing the magnetic attractive force created between the rotor and the yoke, and a second stopper member that arrests the rotor at the second end position by utilizing the magnetic attractive force created between the rotor and the yoke, and wherein the shutter blade is driven to one of three positions selected from a full opening position for opening the lens aperture, a full closing position for closing the lens aperture, and a half opening position for partially opening the lens aperture, the three positions of the shutter blade corresponding to the three positions of the rotor. Preferably, the shutter blade is selectively driven to one of the full opening position in correspondence to the first end position of the rotor, the full closing position in correspondence to the intermediate position of the rotor, and the half opening position in correspondence to the second end position of the rotor. Preferably, the shutter blade is selectively driven to one of the full opening position in correspondence to the first end position of the rotor, the half opening position in correspondence to the intermediate position of the rotor, and the full closing position in correspondence to the second end position of the rotor.

Still further, an inventive diaphragm apparatus comprises a diaphragm blade that is arranged on a substrate having a lens aperture and that regulates a diameter of the lens aperture, and an electromagnetic actuator that is engaged with the diaphragm blade to drive the diaphragm blade, wherein the electromagnetic actuator comprises a rotor that is magnetized in two poles and that is rotatable in two directions between a first end position and a second end position via an intermediate position, a yoke that has a horseshoe-like shape and that is arranged relative to the rotor such that a magnetic attractive force is created when the rotor comes to either of the first end position and the second end position, a coil that is wound around the yoke and that rotates the rotor in an energizing state where an electric current is applied to the coil, and auto-retaining means for retaining the rotor at one of three positions selected from the intermediate position, the first end position and the second end position under a non-energizing state where the electric current is not applied to the coil, the auto-retaining means comprising an elastic member that regulates the rotor at the intermediate position by a mechanical elastic force, a first stopper member that arrests the rotor at the first end position by utilizing the magnetic attractive force created between the rotor and the yoke, and a second stopper member that arrests the rotor at the second end position by utilizing the magnetic attractive force created between the rotor and the yoke, and wherein the diaphragm blade is driven selectively to three positions for setting the lens aperture in a large diameter, a medium diameter and a small diameter, respectively, the three positions of the diaphragm blade corresponding to the three positions of the rotor.

The electromagnetic actuator according to the first aspect of the present invention is a moving magnet motor constituted by a rotor composed of a permanent magnet and a coil wound around the rotor. The moving magnet motor enables the rotor to be self-regulated at three points, i.e., an intermediate position, a first end position and a second end position by a combined use of the mechanical elastic force of an elastic member and the magnetic attraction force of a magnetic member. Here, auto-retaining means retains the rotor at a predetermined position in the non-energizing state where energization to the coil is shut off. The shutter apparatus according to the present invention uses as a drive source the electromagnetic actuator capable of auto-retaining the rotor at the above-described three points. A shutter blade is coupled to the electromagnetic actuator and can be shifted to three points, i.e., a full opening position, a full closing position and a half opening position in correspondence to the three points of the auto-retaining. In particular, the half opening position is associated with a small aperture state, and the present shutter apparatus serves as both the shutter mechanism and the diaphragm mechanism. Further, the diaphragm apparatus according to the present invention uses the above-described electromagnetic actuator as a drive source. The diaphragm blade is coupled with this electromagnetic actuator and can set the aperture in the three stages, i.e., large, medium and small diameters in accordance with the three points of the rotor capable of being self-regulated.

The electromagnetic actuator according to the second aspect of the present invention is a stepping motor provided with a horseshoe-like yoke. This electromagnetic actuator includes auto-retaining means and enables the rotor to be self-regulated in the non-energizing state at any of the first end position, the second end position and the intermediate position. The first end position and the second end position are placed at both ends of an operating angle of the rotor. By incorporating such an electromagnetic actuator as a drive source for the shutter apparatus, the shutter blade can be shifted to three points, i.e., a full opening position, a full closing position and a half closing position in connection with the three points of the self-regulated rotor. Utilizing the half opening position as a small aperture state causes the present shutter apparatus to have a two-stage aperture structure of the full opening position and the half opening position. The shutter apparatus serving as both the shutter mechanism and the diaphragm mechanism can be driven by the single electromagnetic actuator. Further, when this electromagnetic actuator is incorporated in the diaphragm apparatus, the diaphragm blade can be set at three points such that the diameter of the lens aperture can be regulated to be large, medium and small in accordance with the three points of the rotor capable of being self-regulated.

As a result, the aperture setting in the three stages can be realized.

DETAILED DESCRIPTION OF THE PREFERRED EMBODIMENTS

Figure 1:
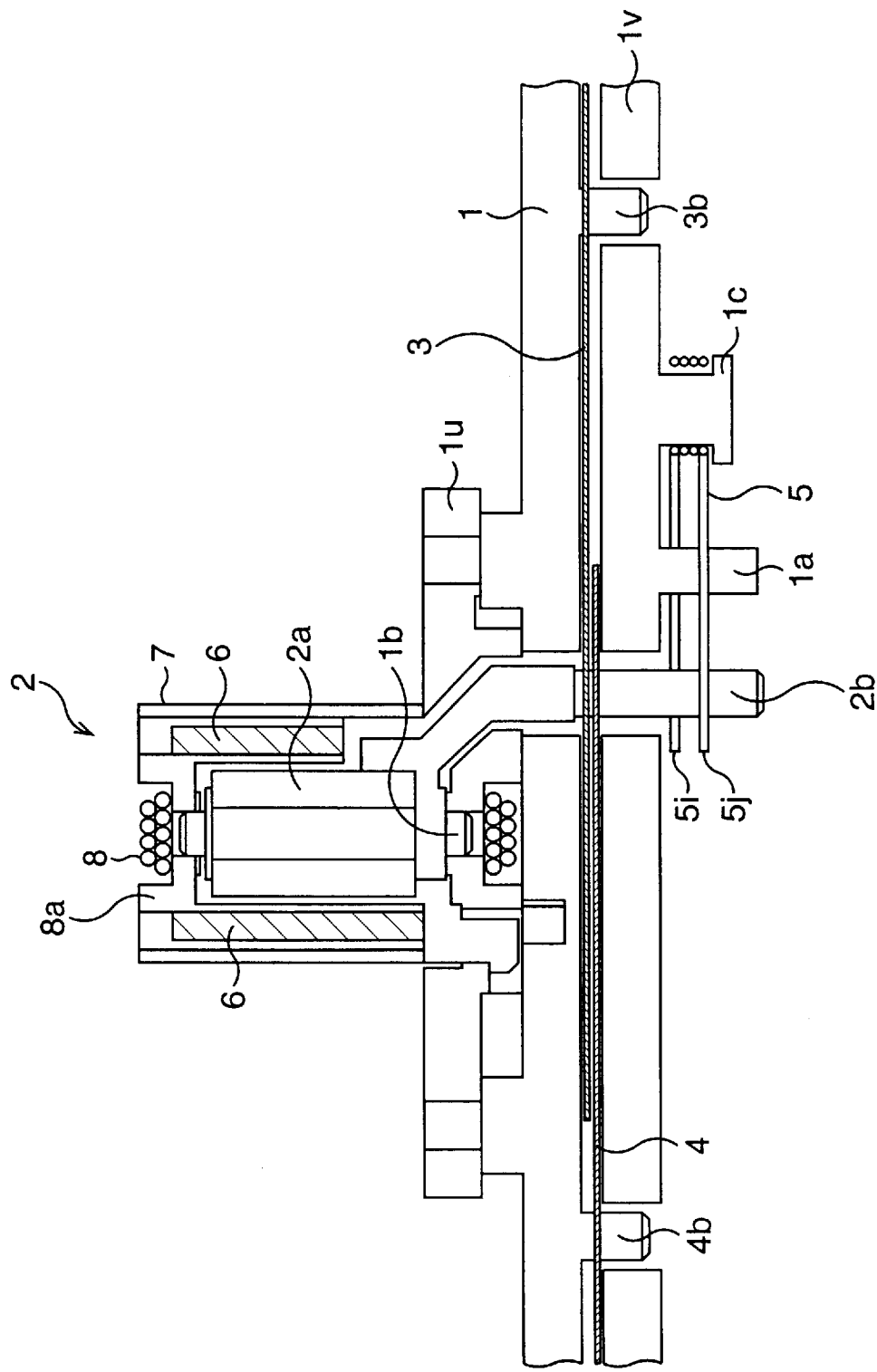
FIG. 1 is a partial cross-sectional view showing a first embodiment of a shutter apparatus according to the present invention.

Preferred embodiments of the present invention will now be described in detail hereinafter with reference to the accompanying drawings. FIG. 1 is a partial cross-sectional view showing a first embodiment of the shutter apparatus according to the present invention. As shown in the drawing, the present shutter apparatus is basically constituted by a pair of shutter blades 3 and 4 and an electromagnetic actuator 2 for driving these shutter blades 3 and 4. The shutter blades 3 and 4 are arranged on a substrate 1 having a lens aperture (not shown) and driven by the electromagnetic actuator 2 to open and close the lens aperture. In this embodiment, one shutter blade 3 pivots around a pin 3b implanted in the substrate 1. The other shutter blade 4 similarly pivots around a pin 4b implanted on the substrate 1. The pair of shutter blades 3 and 4 are accommodated in a blade room provided between the substrate 1 and a blade holder 1v.

The electromagnetic actuator 2 is mounted on the substrate 1 through a support body 1u and coupled with the shutter blades 3 and 4 so that the shutter blades 3 and 4 are driven to be opened and closed. The electromagnetic actuator 2 is of a so-called moving magnet motor type and made up of a rotor 2a consisting of a permanent magnet and a coil 8 which is wound around the rotor 2a and rotates the rotor 2a in accordance with energization. The rotor 2a has a shaft 1b and can be rotated in both directions between one end position and the other end position via the intermediate position therebetween. The angular span between the one end position (the first end position) and the other end position (the second end position) defines an operating angle range. An operating pin 2b is integrally attached to the rotor 2a by resin molding and is engaged with the shutter blades 3 and 4 to drive these blades 3 and 4. The coil 8 is wound around a coil frame 8a and rotates the rotor 2a in both directions hrough the operating angle range in accordance with energization. A yoke 7 is attached to an outer periphery of the coil frame 8a.

As a characteristic feature of the present invention, the electromagnetic actuator 2 includes auto-retaining means for retaining the rotor 2a at the intermediate position, the one end position or the other end position under the non-energizing state in which the coil 8 is not energized, that is, an electric current is not applied to the coil 8. Specifically, the auto-retaining means includes: an elastic member 5 for regulating the rotor 2a at the intermediate position by a mechanical elastic force; one magnetic member 6 which is opposed to the rotor permanent magnet and retains the rotor 2a at the one end position by a magnetic attractive force; and the other magnetic member 6 which is opposed to the rotor permanent magnet and retains the rotor 2a at the other end position by the magnetic attractive force. In this embodiment, the elastic member 5 is composed of a coil spring having a pair of open end portions 5i and 5j and is attached to a fixing pin 1c formed on the blade holder 1v. A guide pin 1a which is similarly implanted to the blade holder 1v is inserted between the pair of open ends 5i and 5j. The operating pin 2b integrally molded with the rotor 2a is held between both the opening ends 5i and 5j of the elastic member 5 and regulated at the intermediate position. The shutter blades 3 and 4 can be shifted to three points, i.e., a full opening position for opening the lens aperture, a full closing position for closing the lens aperture and a half opening position for partially opening the lens aperture in connection with the three points of the rotor 2a which can be held by the above-described auto-retaining means.

As described above, in this embodiment, at an initial point (one end position) and an end point (the other end position) of the operating angle range of the moving magnet motor, each magnetic member 6 for generating the magnetic attractive force is provided between the permanent magnet constituting the rotor 2a and the yoke 7, and the elastic member 5 for retaining the operating pin 2b of the rotor 2a is provided at the intermediate position of the operating angle. Auto-retaining is carried out by the attractive force between the permanent magnet and the magnetic member 6 at the initial point and the end point of the operating angle of the moving magnet motor. Further, the rotor 2a can be held by the elastic force of the elastic member 5 at the intermediate position of the operating angle. Moreover, the rotor can be rotated by energizing the coil 8, which is placed on the outside of the magnet, in the range from the initial point to the intermediate point. Rotating is stopped at the intermediate position by controlling the energization time or the application voltage as well as effecting braking energization.

Figure 2:
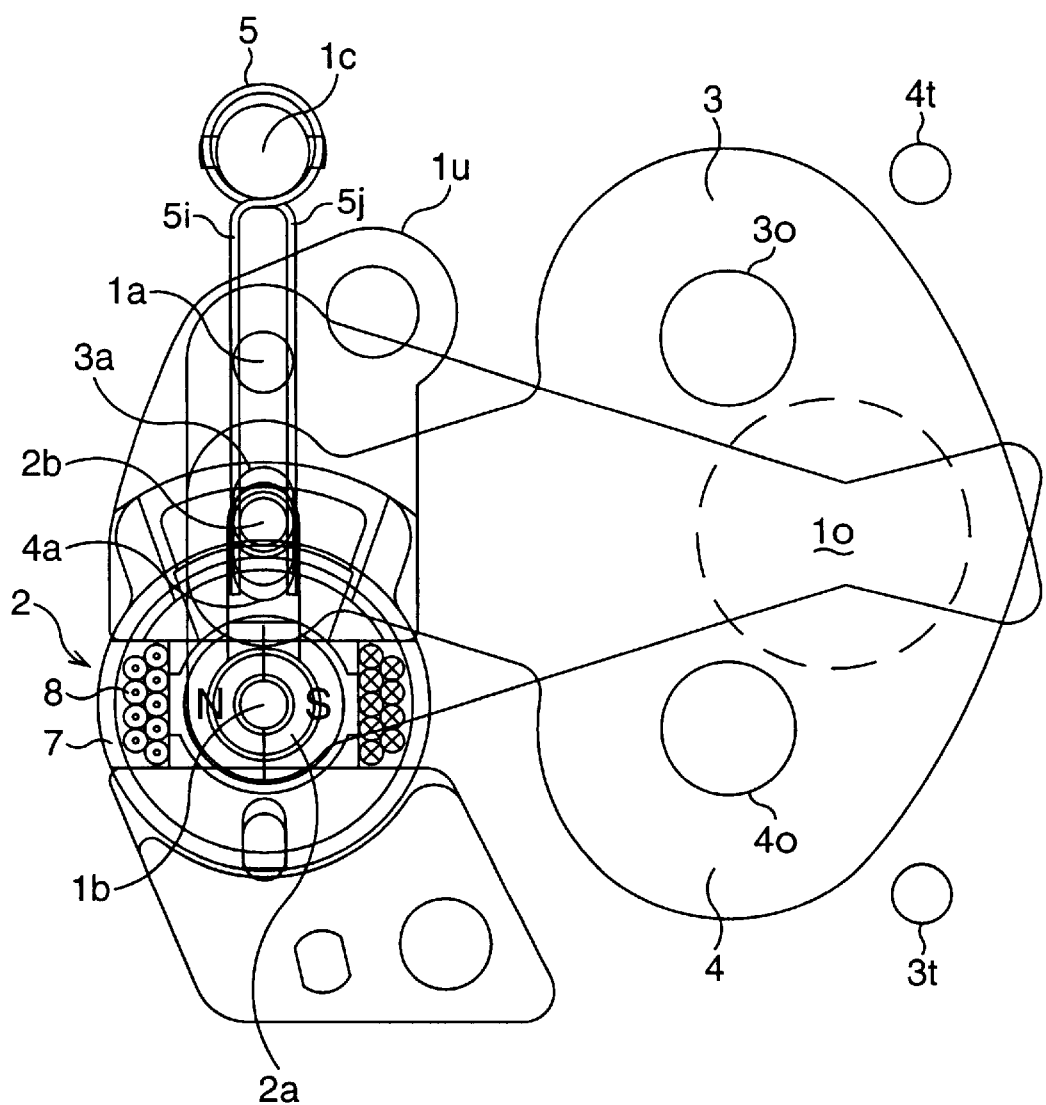
FIG. 2 is a plan view of the shutter apparatus according to the first embodiment.

FIG. 2 is a typical plan view showing the shutter apparatus seen from the lower side of the substrate (shutter blade side). In the illustrated state, the rotor 2a of the electromagnetic actuator 2 is at the intermediate position, and the pair of the shutter blades 3 and 4 coupled with the operating pin 2b are placed at the full closing position for closing the lens aperture 1o formed in the substrate. The rotor 2a consisting of the permanent magnet has the operating pin 2b united as one body by resin. The operating pin 2b is engaged with long grooves 3a and 4a for operation respectively formed in the pair of the shutter blades 3 and 4. With this structure, the shutter blades 3 and 4 can rotate around the rotating pin implanted to the substrate. Further, to the substrate are provided a fixing pin 1c for holding the elastic member 5 and a guide pin 1a for guiding the elastic member 5. As a result, both of the open end portions 5i and 5j of the elastic member 5 are so arranged as to sandwich the operating pin 2b of the rotor 2a. The illustrated electromagnetic actuator 2 is constituted by the rotor 2a, the coil 8 and the yoke 7. By energizing the coil 8 in both of the forward and reverse directions, the rotor 2a can be rotated in the clockwise and counterclockwise directions through a predetermined operating angle range.

Figure 3:
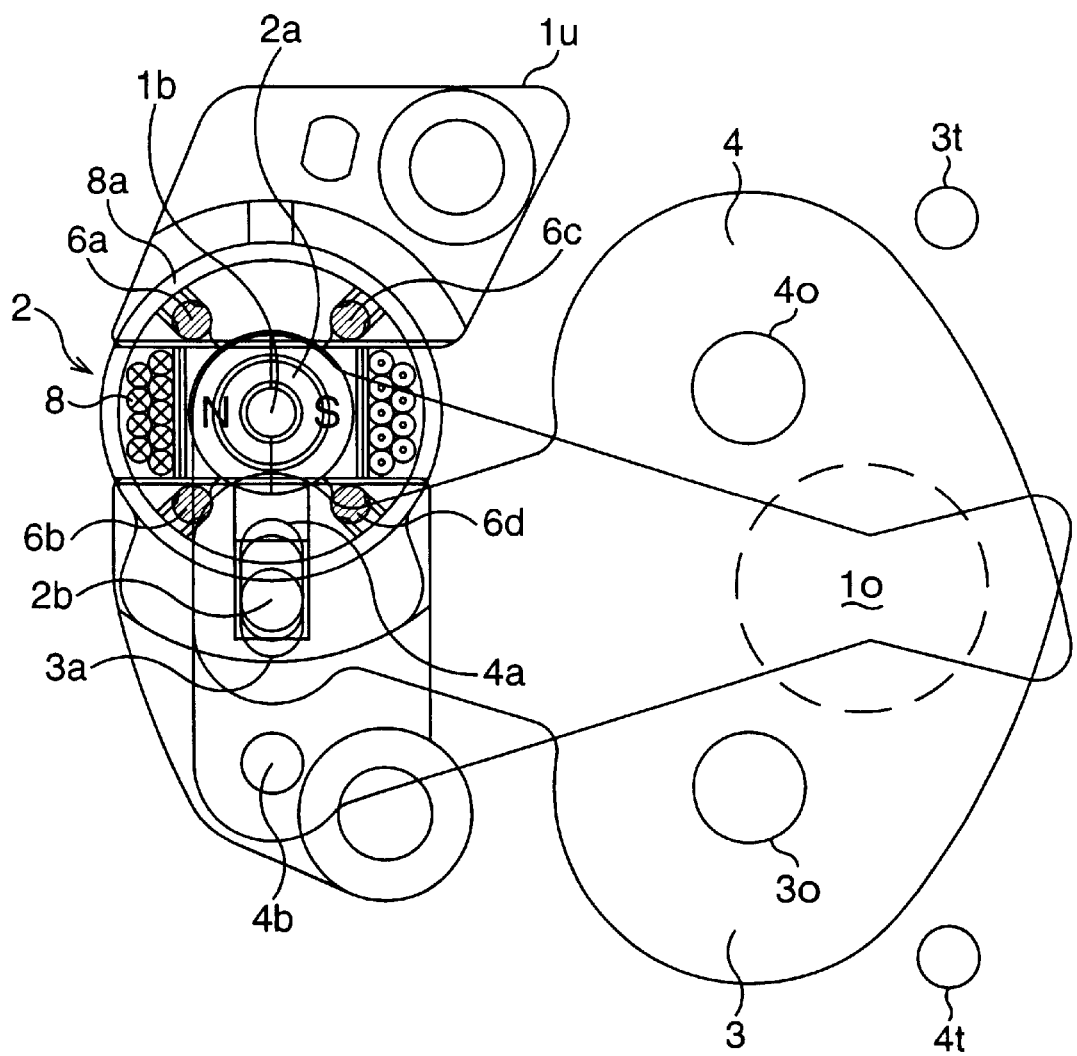
FIG. 3 is a plan view of the first embodiment.

FIG. 3 is a typical plan view showing the shutter apparatus depicted in FIG. 1 seen from the upper side of the substrate (motor side), wherein the rotor 2a is held at the intermediate position as similar to FIG. 2 and the pair of the shutter blades 3 and 4 are set at the full closing position. As shown in the drawing, four grooves are provided to the coil frame 8a around which the coil 8 is wound at intervals of 90°, and four magnetic members 6a, 6b, 6c and 6d for generating the magnetic attractive force are attached between the rotor magnet and these grooves. When the rotor 2a consisting of the permanent magnet magnetized in two poles is moved to the intermediate position, the elastic force of the elastic member overcomes the attractive force of the magnetic members 6a to 6d so that the rotor 2a is regulated at the intermediate position as shown in the drawing.

In the state illustrated in FIGS. 2 and 3, the attractive forces between the rotor magnet and the four magnet bodies 6a to 6d are, on one hand, cancel out each other, and the rotor 2a, on the other hand, stands still at the intermediate position by the retaining force of the elastic member 5.

Figure 4:
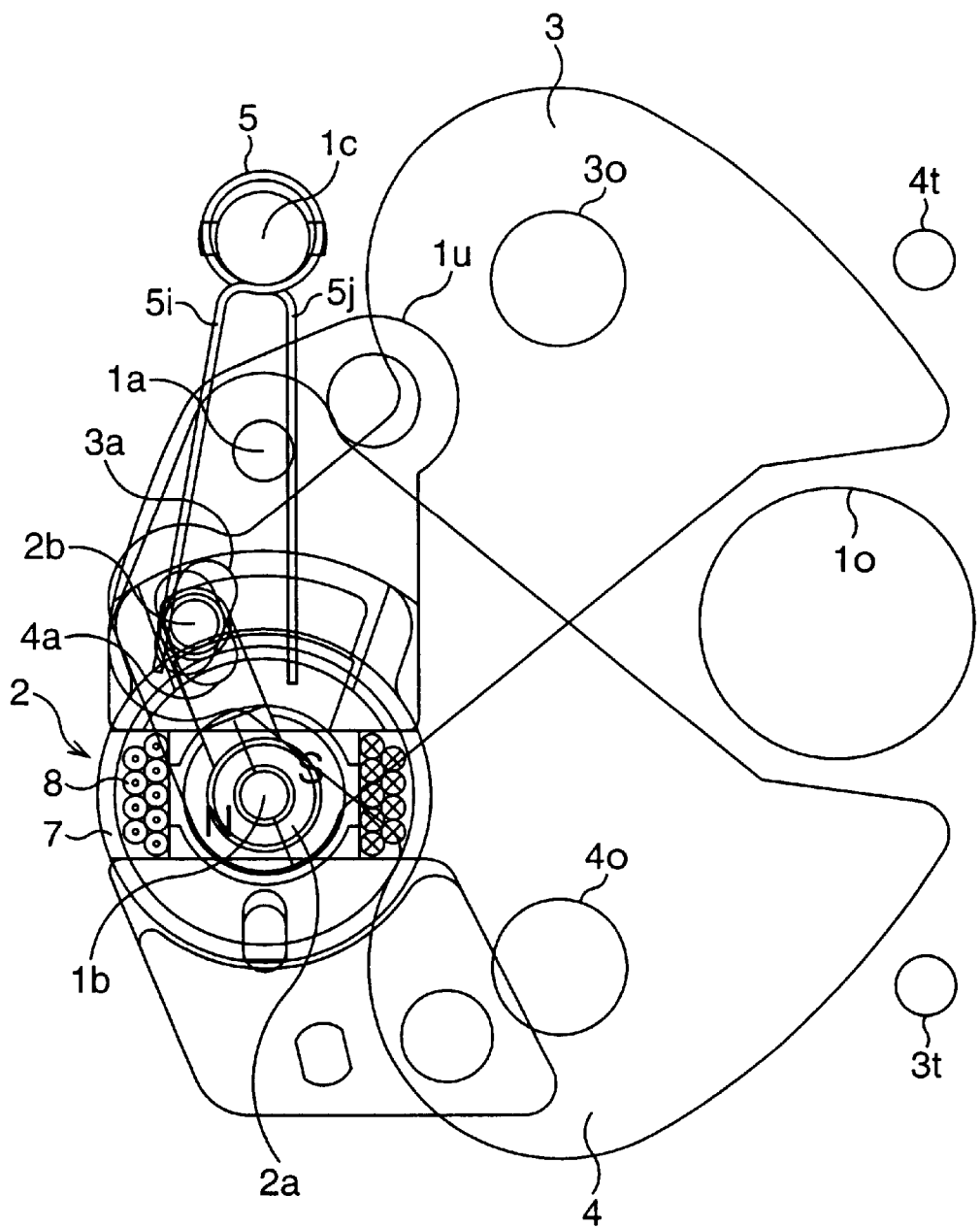
FIG. 4 is a plan view of the first embodiment.
Figure 5:
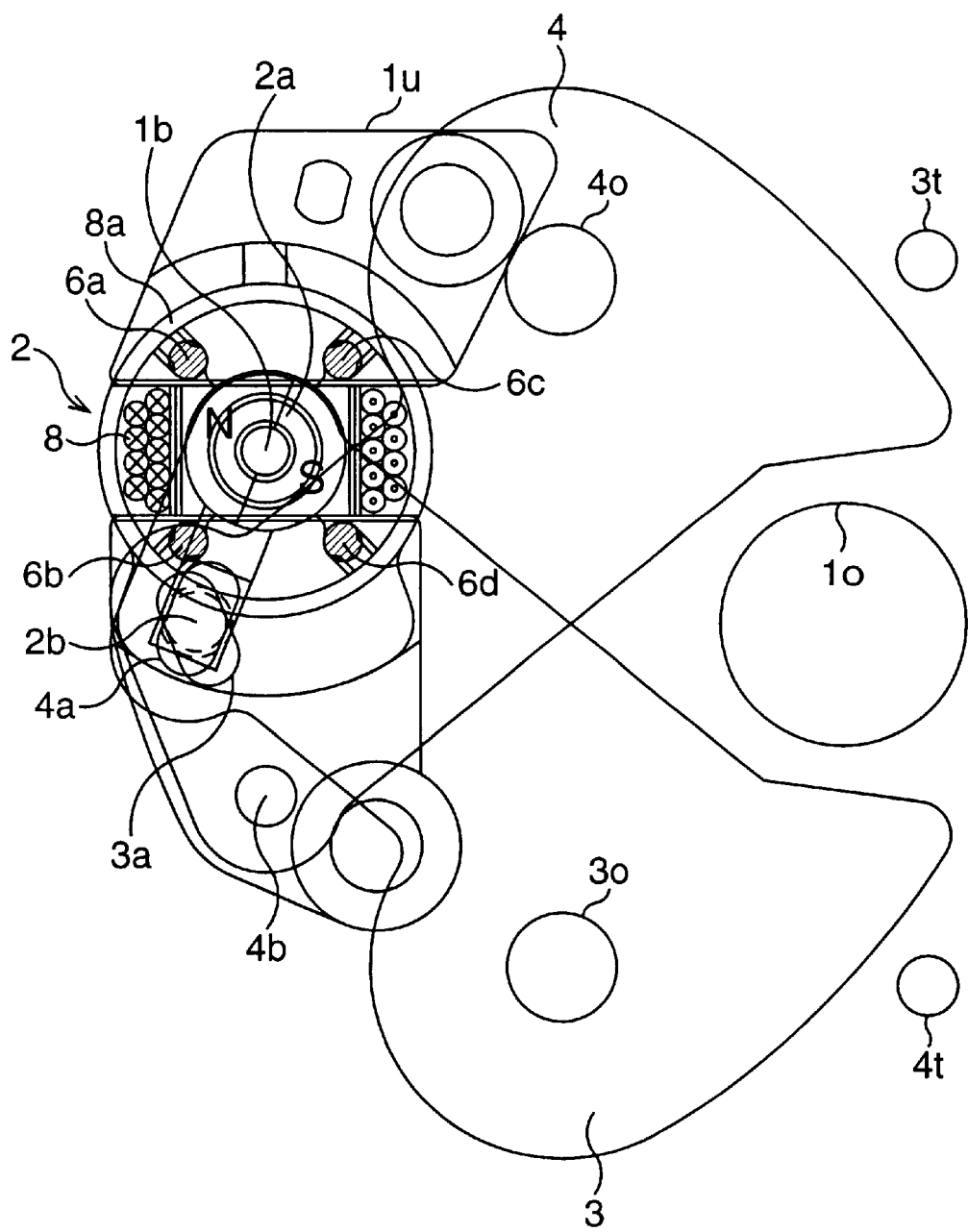
FIG. 5 is a plan view of the first embodiment.

FIGS. 4 and 5 shows the state where the rotor is held at the one end position. FIG. 4 is a plan view showing that state from the shutter blade side, and FIG. 5 is a plan view showing the same state from the motor side. As shown in the drawings, when the rotor 2a is held at the one end position which is the limit in the counterclockwise direction, the shutter blades 3 and 4 coupled to the rotor 2a are set at the full opening position for opening the lens aperture 1o. When the rotor 2a is moved to the one end position, the attractive force of the magnetic members 6a and 6d overcome the elastic force of the elastic member 5 and the rotor 2a is held at the one end position. A relatively large amount of energization is required to the coil 8 when driving the rotor 2a from the intermediate position to the one end position.

On the contrary, when driving the rotor 2a from the one end position to the intermediate position, a relatively small amount of energization is required to the coil 8.

As shown in FIG. 4, when energizing the coil 8 to flow an electric current in the direction to the rear side of the drawing relative to the S pole as seen from the shutter blade side, the rotor 2a rotates in the counterclockwise direction by the electromagnetic force and stops at a position where the operating pin 2b abuts on the coil frame 8a. Even if energization is interrupted in this state, the attractive force between the rotor magnet and the magnetic members 6a and 6d exceeds the elastic force of the elastic member 5, and the auto-retaining is attained in that state. Subsequently, when the coil 8 is energized in the reverse direction, the rotor 2a rotates in the clockwise direction. At this time, by controlling the energization time and also by performing the braking energization or the voltage control so as not to be excessive, the rotor 2a can be stopped at the intermediate position as shown in FIG. 2. As described above, even if the energization is shut off at the intermediate position, the rotor 2a can be self-regulated.

Figure 6:
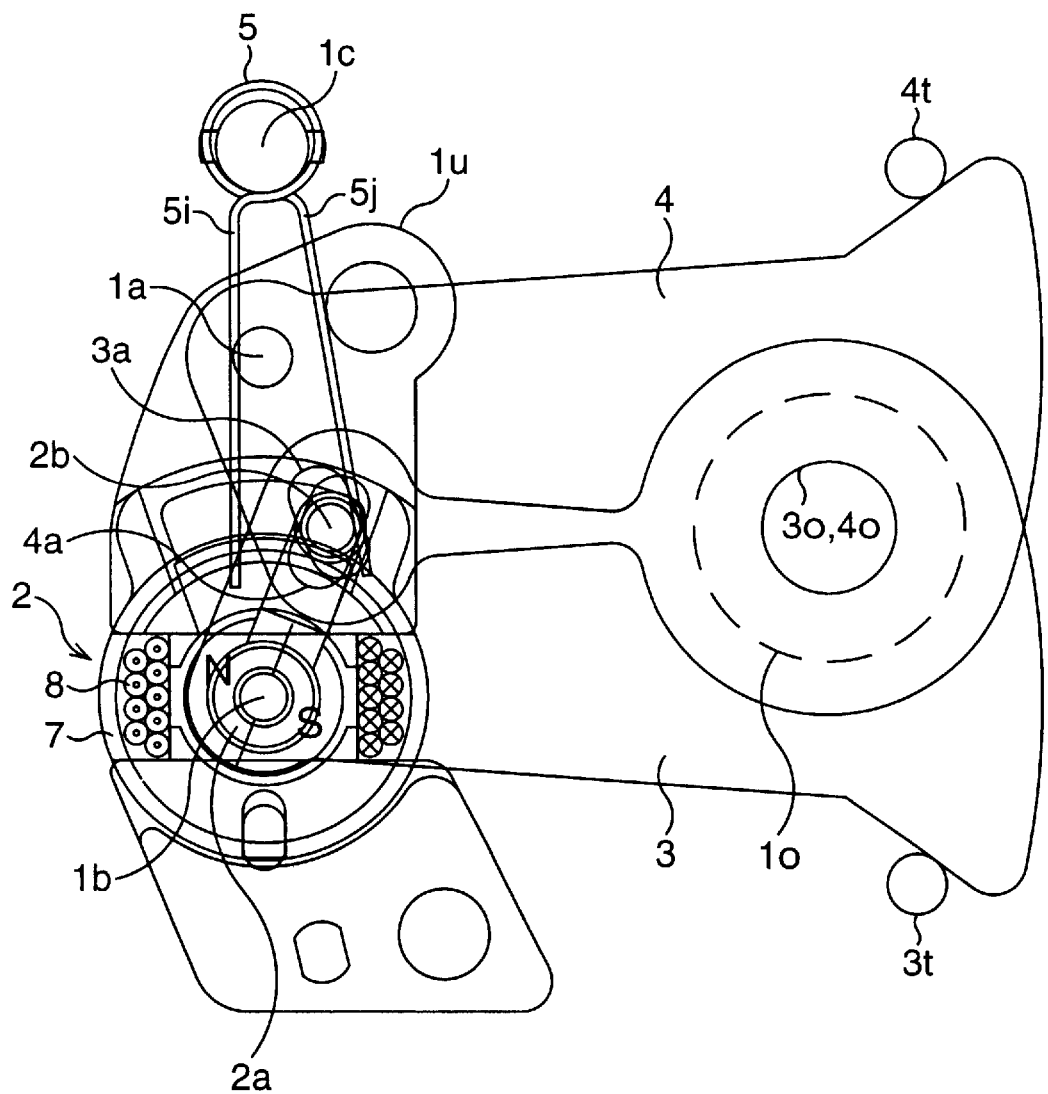
FIG. 6 is a plan view of the first embodiment.
Figure 7:
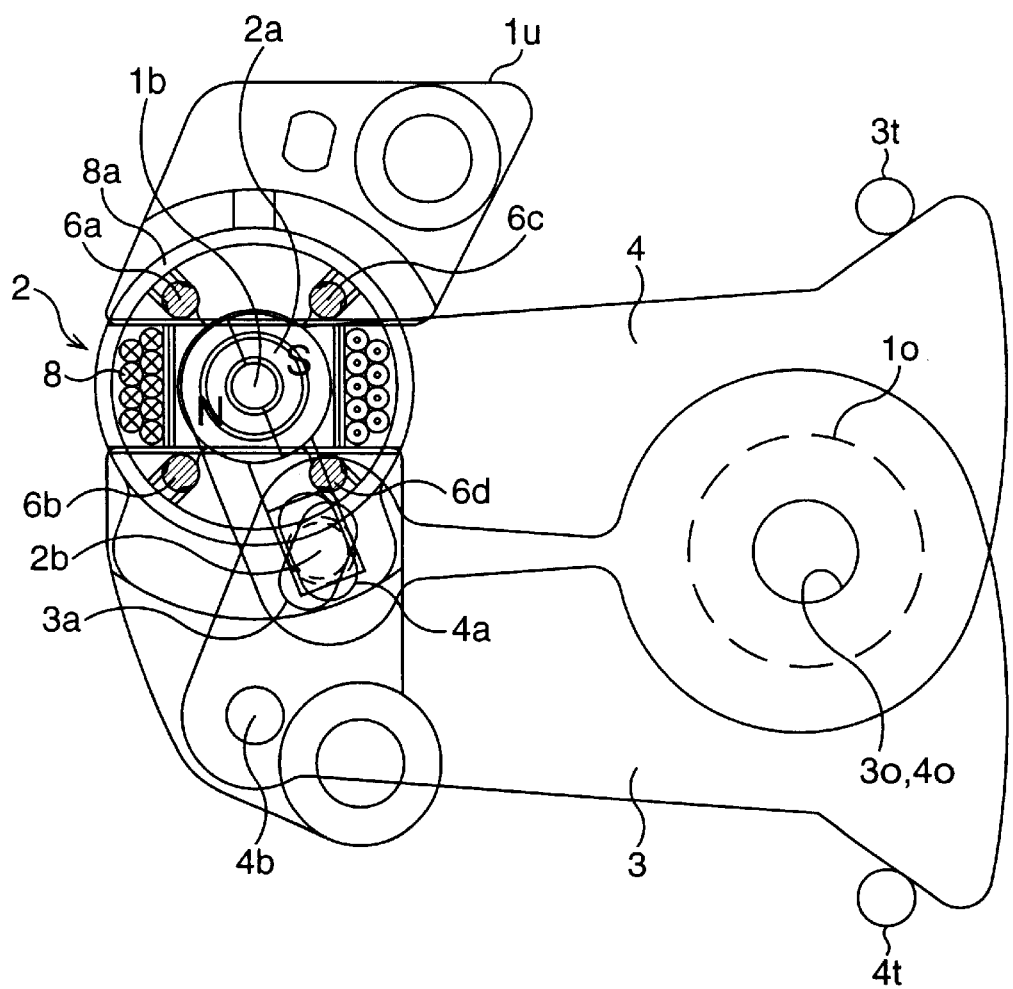
FIG. 7 is a plan view of the first embodiment.

FIGS. 6 and 7 show the state where the rotor 2a is held at the other end position. FIG. 6 is a plan view showing that state from the shutter blade side, and FIG. 7 is a plan view showing the same state seen from the motor side.

In the state where the rotor 2a is held at the other end position, the pair of the shutter blades 3 and 4 coupled with the operating pin 2b are placed at the half opening position for partially closing the lens aperture 1o. At this time, the shutter blade 3 is brought into contact with a pin 3t implanted to the substrate, and the shutter blade 4 is similarly brought into contact with a pin 4t implanted to the substrate. An opening 3o is formed in the shutter blade 3, and an opening 4o is also formed in the shutter blade 4. At the half opening position in the drawing, these openings 3o and 4o overlap each other in the center of the lens aperture 1o, which results in the small aperture state. When the rotor 2a is moved to the other end position, the attractive force of the magnetic members 6b and 6c overcomes the elastic force of the elastic member 5, and the rotor 2a is held as it is. An amount of energization of the coil 8 required for driving the rotor 2a from the intermediate position to the other end position is larger than that required for driving the rotor 2a from the other end position to the intermediate position. When the coil 8 is energized in the reverse direction under the state where the rotor 2a is held at the intermediate position, the rotor 2a can rotate in the clockwise direction against the elastic force of the elastic member 5. After rotating in the clockwise direction by the electromagnetic force, the rotor 2a is brought into contact with a stopper formed in the coil frame 8a and stopped. In such a case, the rotor 2a can be self-regulated at the other end position shown in the drawing by the attractive force between the rotor magnet and the magnetic members 6b and 6c even if power feeding is shut off. Moreover, in order to return the rotor 2a from the other end position to the intermediate position, the rotor 2a is driven to the original state by performing energization in the forward direction as well as controlling the energization time and executing the braking energization. As apparent from the above description, in this embodiment, the shutter blades 3 and 4 are placed at the full opening position in connection with one end position of the rotor 2a, at the full closing position in connection with the intermediate position of the rotor 2a and at the half opening position (small aperture position) in connection with the other end position of the rotor 2a.

In cases where the shutter apparatus according to the first embodiment shown in FIGS. 1 to 7 is used in a regular still camera, the shutter blades 3 and 4 are set at the full opening position before the exposure operation. In other words, the motor is held at the intermediate position. Thereafter, the aperture is selected in accordance with brightness information of an object. That is, the full opening state or the half opening state is selected. The coil 8 is energized in the forward direction or the reverse direction in accordance with a result of this selection, and the motor is rotated to the one end side in the counterclockwise direction or the other end side in the clockwise direction. After elapse of a set exposure time, the energization polarity is reversed to return the motor to the intermediate position. As a result, the shutter blades 3 and 4 are returned from the full opening position or the half opening position to the initial full closing position.

In cases where the shutter apparatus according to the first embodiment shown in FIGS. 1 to 7 is used in the digital still camera, the shutter blades 3 and 4 are set to the full opening position or the half opening position in advance in accordance with the brightness of an object measured in a through condition. That is, the coil 8 is previously energized and the motor is moved to the one end position or the other end position to be self-regulated. Subsequently, a release switch is turned on and the coil is energized at the same time. Further, the shutter blades 3 and 4 are returned from the full opening position or the half opening position to the full closing position.

As apparent from the above explanation, in the first embodiment, in the three non-energizing states, the intermediate position (intermediate point) of the motor is associated with the full closing position of the shutter blade; the one end position (initial point) of the same is associated with the full opening position; and the other end position (end point) of the same is associated with the half opening position. In this case, as to the digital still camera, since the shutter blade is operated from the full opening position or the half opening position to the full closing position, the motor might be operated to overrun from the initial point to the end point without stopping at the intermediate point when the current supplied to the motor is increased excessively. In order to avoid this problem, relatively complicated electric control must be performed. Further, the shutter blade must pass the full closing position when switching between the full opening and the half opening in accordance with the brightness of an object measured in the through condition, and control becomes relatively complicated. In view of the above-described problems, in the second embodiment described below, the shutter blade is positioned at the full opening position in connection with the one end position of the rotor, at the half opening position in connection with the intermediate position of the rotor and at the full closing position in connection with the other end position of the rotor. That is, the intermediate operating point of the motor is set to the medium aperture in the half opening state of the shutter blade. The initial point and the end point are set to the full opening state and the full closing state, respectively. Since the shutter blade is set to be fully opened at the initial point of the motor and partially opened at the intermediate point, a rated maximum current can flow in the coil in the exposure operation to the full closing state from each of the opening states, thereby shortening the closing time of the shutter. Further, the full opening position and the half opening position can be continuously switched in the through condition. Therefore, control can be relatively simplified as compared with the first embodiment.

Figure 8:
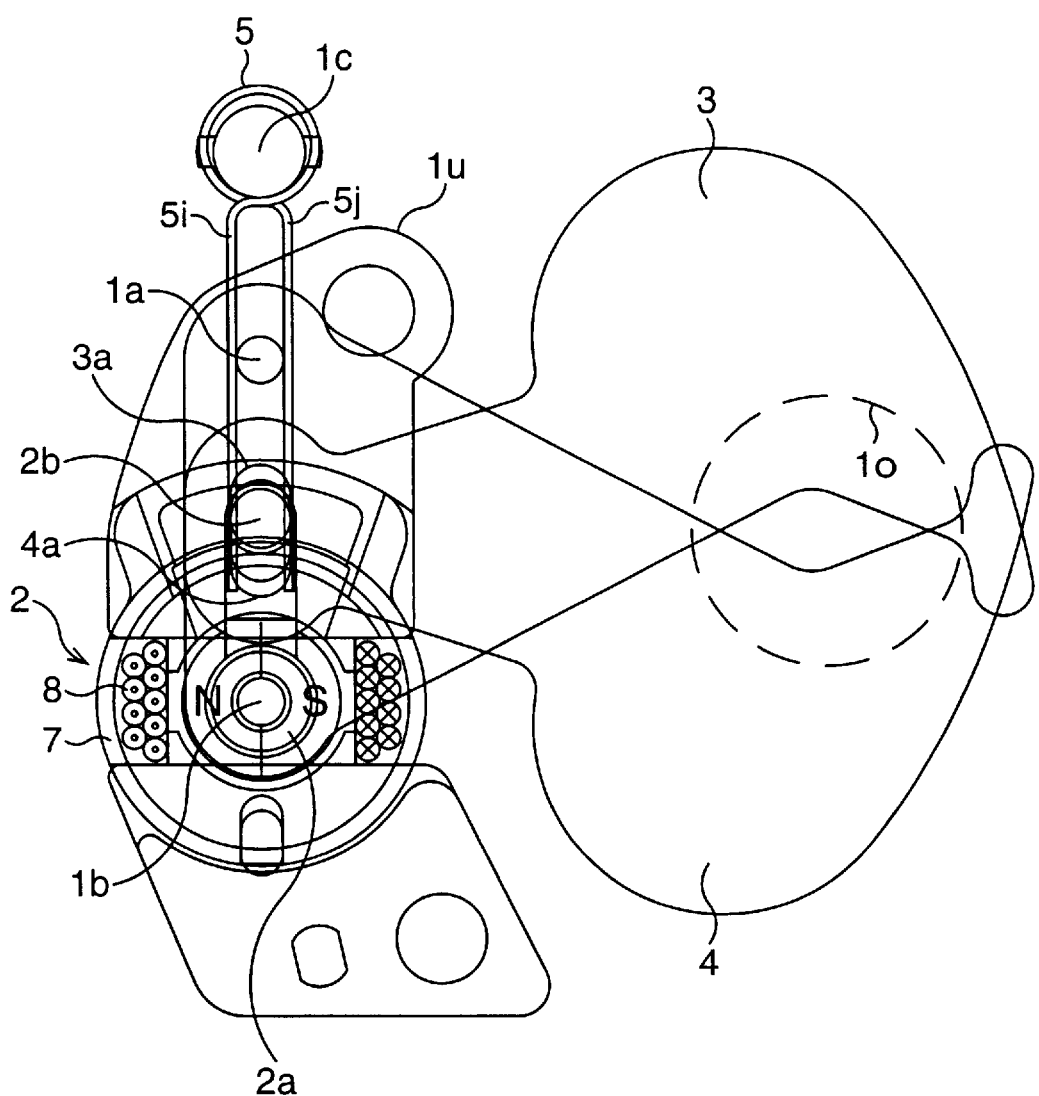
FIG. 8 is a plan view of a second embodiment of a shutter apparatus according to the present invention.
Figure 9:
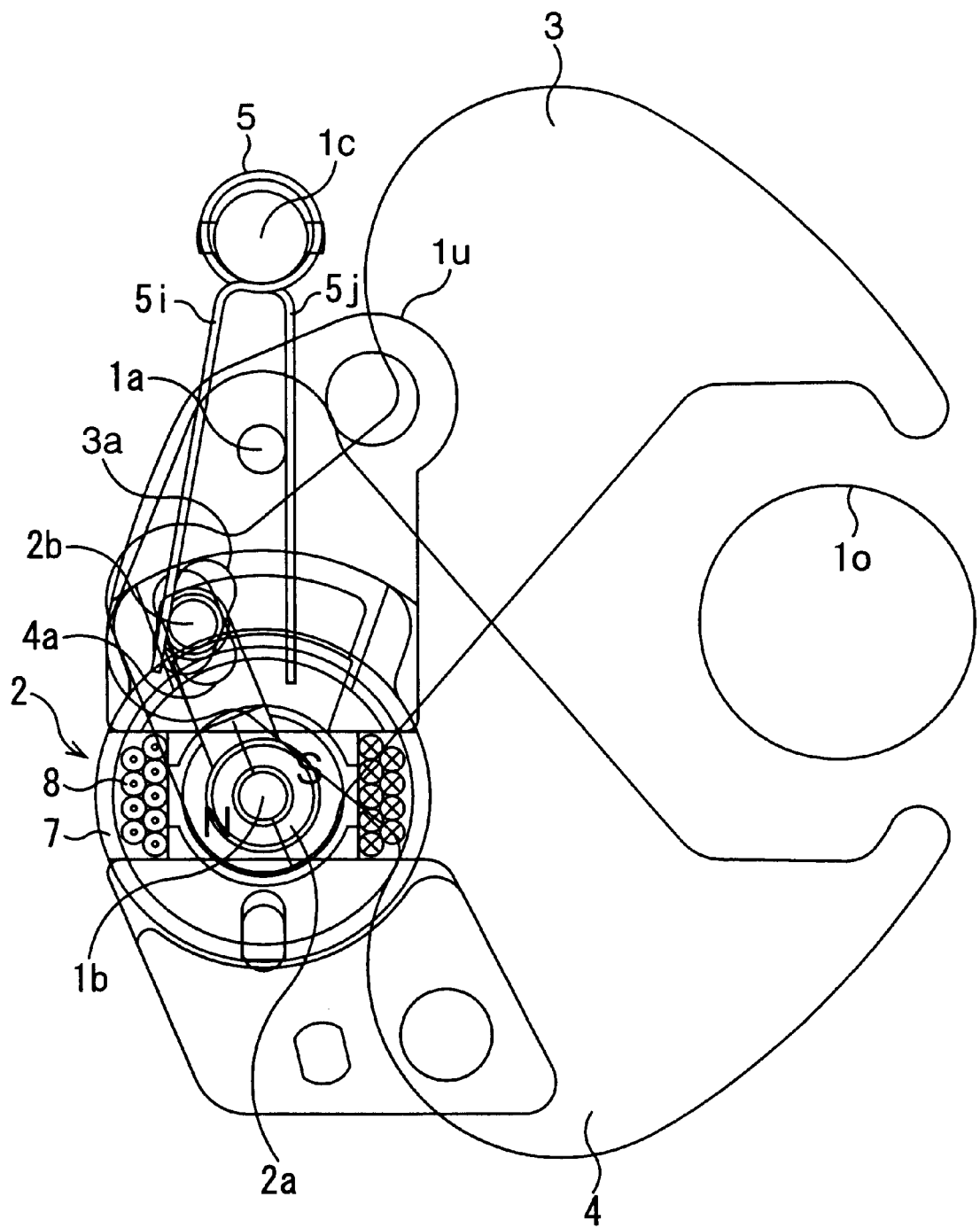
FIG. 9 is a plan view of the second embodiment.
Figure 10:
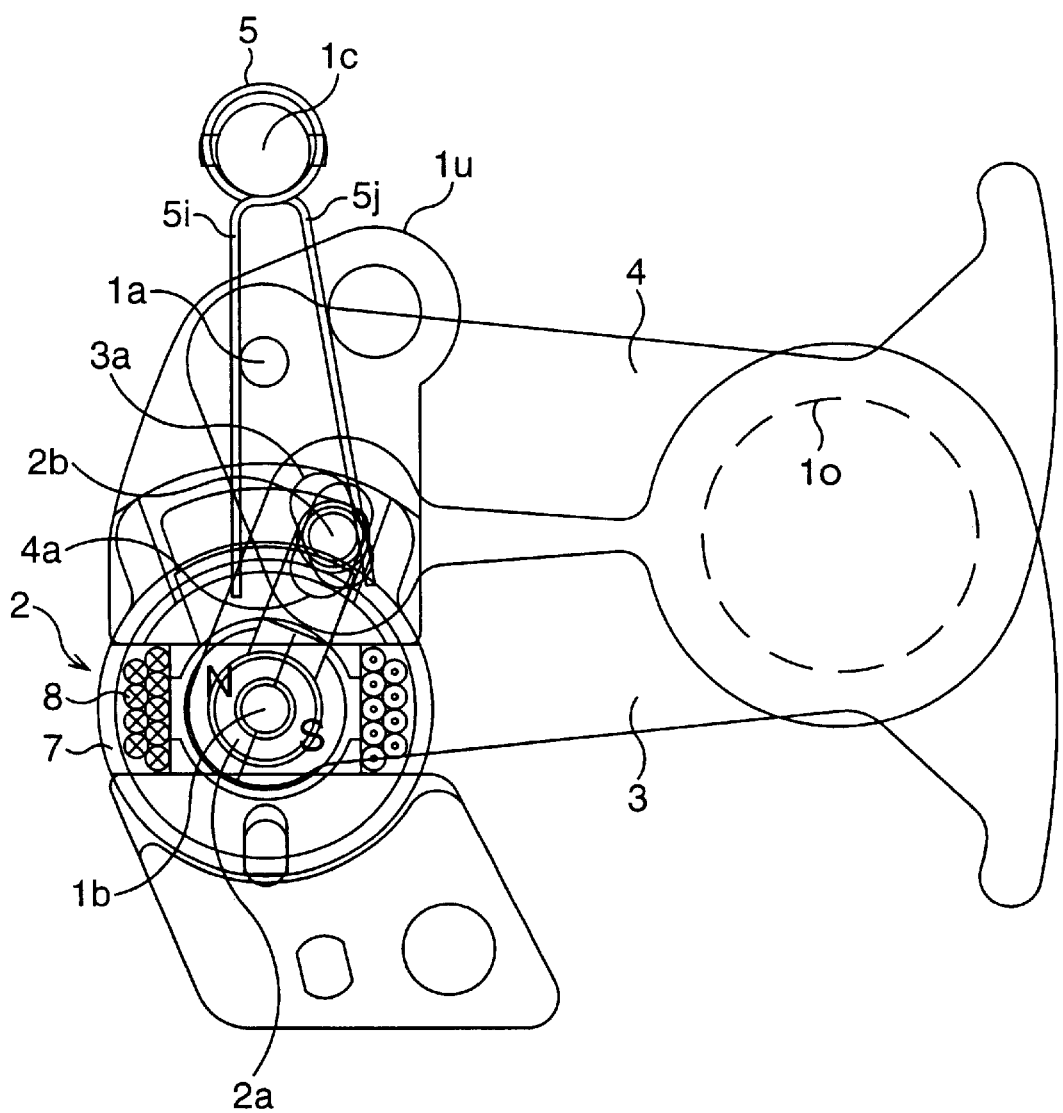
FIG. 10 is a plan view of the second embodiment.

The above-described second embodiment will now be described in detail with reference to FIGS. 8, 9 and 10. FIG. 8 is a typical plan view showing the shutter apparatus according to the second embodiment seen from the shutter blade side, in which the rotor 2a is held at the intermediate position (intermediate point) by the elastic member 5. At this time, a pair of shutter blades 3 and 4 coupled with the operating pin 2b of the rotor 2a partially overlap on the lens aperture 1o, such that the blades 3 and 4 are set in the half opening state (medium aperture state). FIG. 9 is a typical plan view showing the state in which the rotor 2a is held at the one end position (initial point) seen from the shutter blade side. As similar to the first embodiment, the rotor 2a is held at the one end position in the non-energizing state by the influence of a magnetic member (not shown) attached to the coil frame. At this time, the pair of shutter blades 3 and 4 are retreated from the lens aperture 1o to both of the sides, and are set to the full opening state. FIG. 10 is a typical plan view showing the state in which the rotor 2a is held at the other end position (end point) seen from the shutter blade side. The pair of shutter blades 3 and 4 engaged with the operating pin 2b of the rotor 2a completely overlap on the lens aperture 1o, and are set in the fully closed state.

Description will now be given as to the operation of the second embodiment. When this embodiment is incorporated in a digital still camera, the coil 8 of the motor is energized in the forward direction with the large current in order to switch from the medium aperture at the intermediate point to the full closing state at the end point. On the contrary, in order to switch back from the medium aperture at the intermediate point to the full opening state at the initial point, energization is carried out in the reverse direction with a relatively large current. In order to switch back from the full opening state at the initial point to the half opening state (medium aperture state) at the intermediate point, energization in the reverse direction is performed with a relatively small current. In order to enable traveling from the full opening position at the initial point to the full closing position at the end point, the energization in the forward direction is carried out with a relatively large current.

Figure 11:
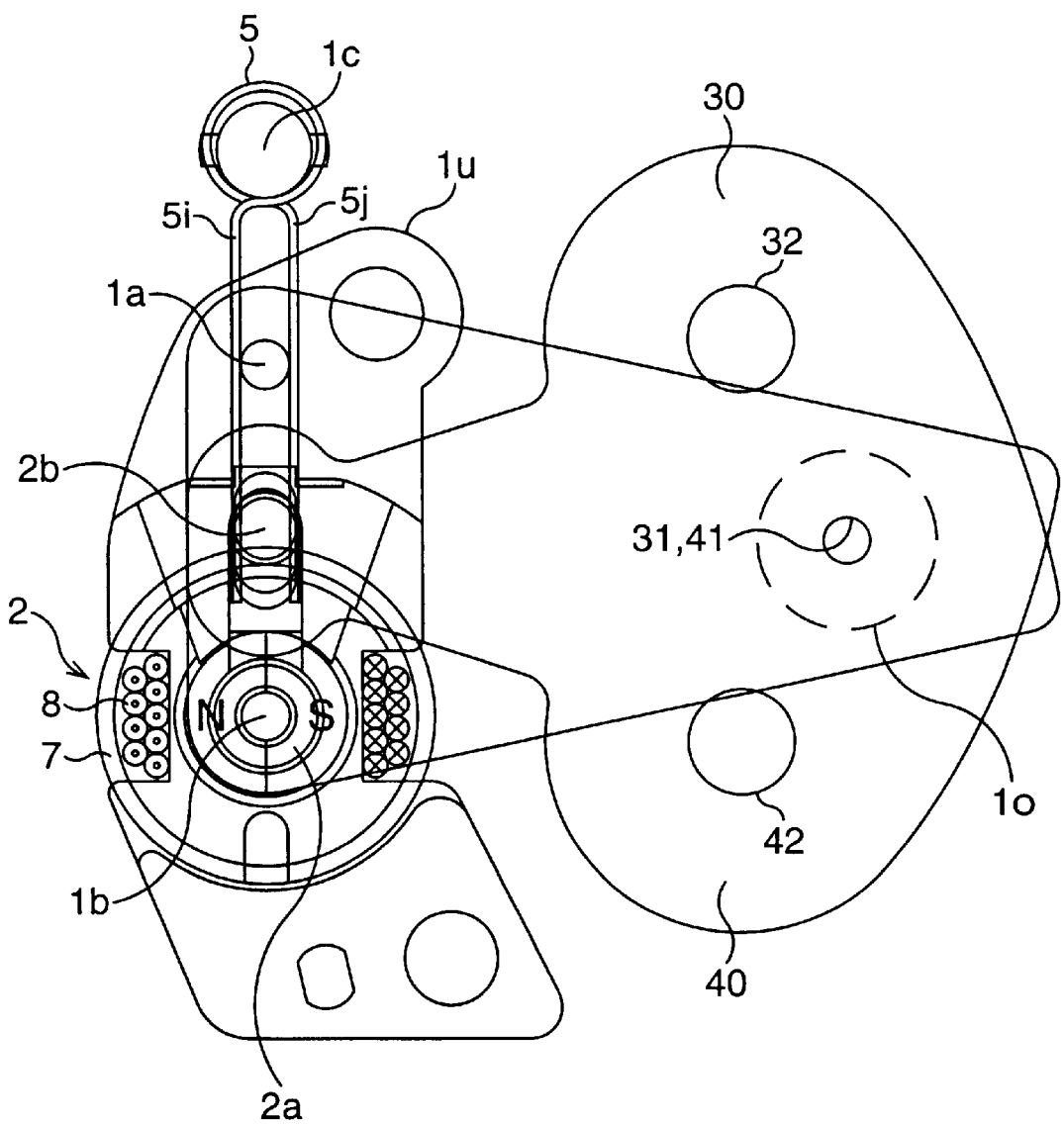
FIG. 11 is a plan view showing an embodiment of a diaphragm apparatus according to the present invention.
Figure 12:
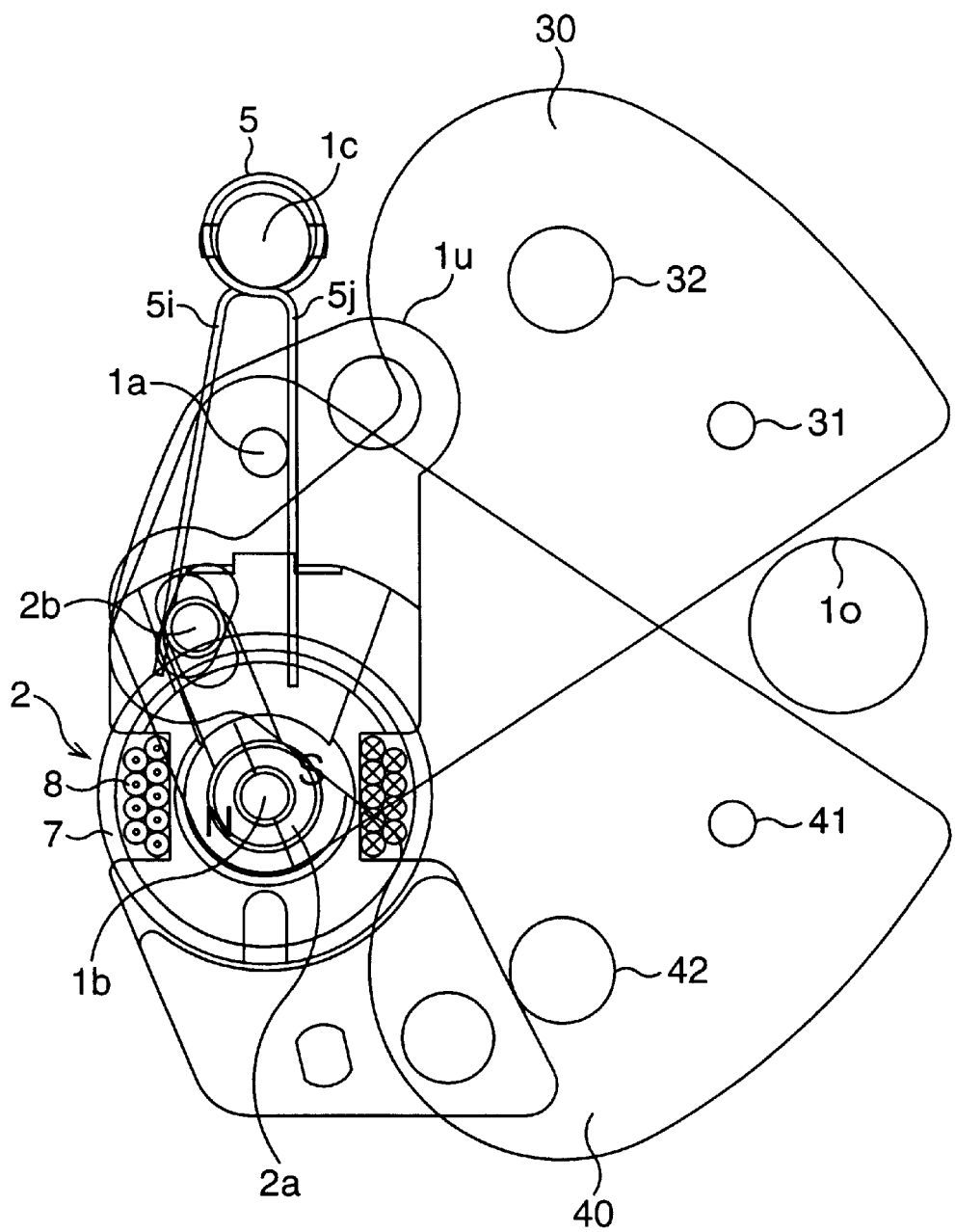
FIG. 12 is a plan view of the diaphragm apparatus.
Figure 13:
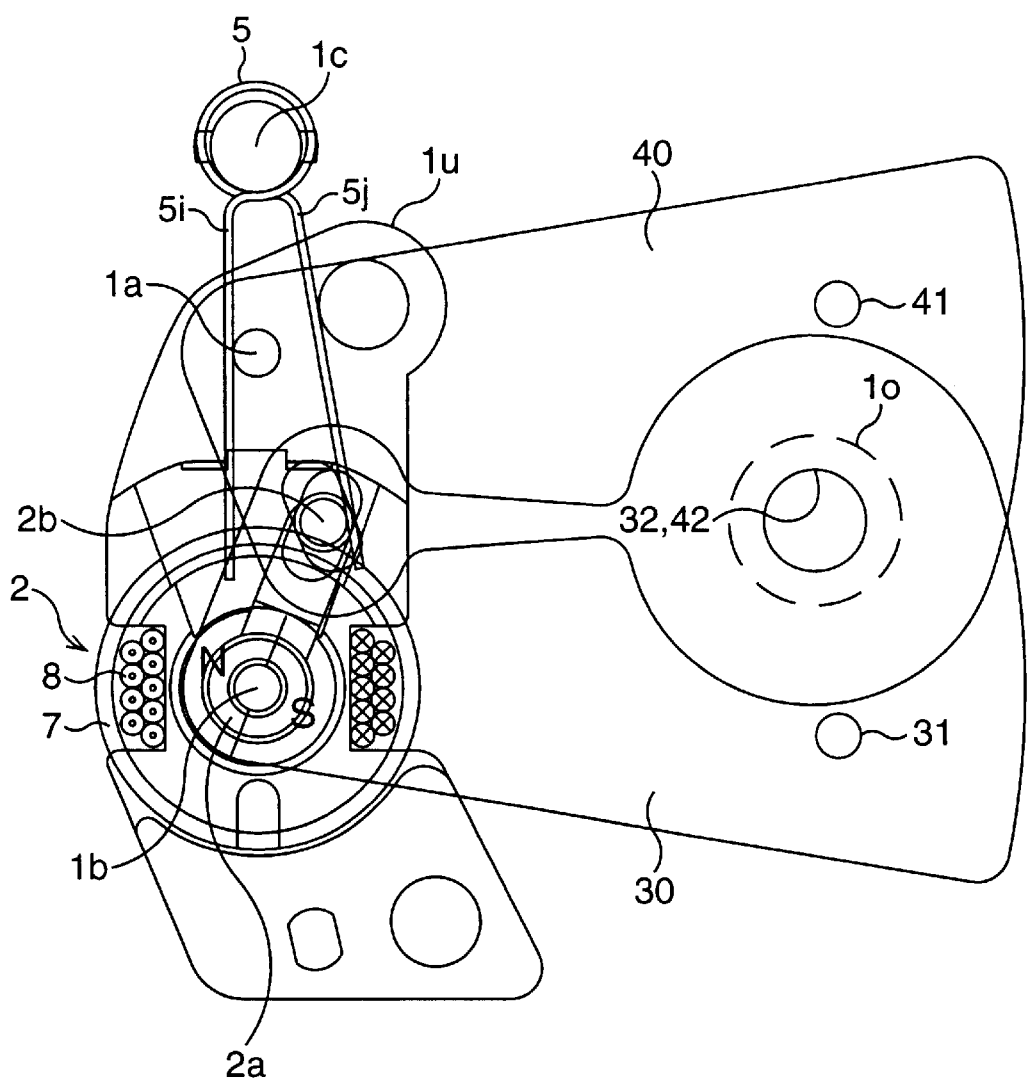
FIG. 13 is a plan view of the diaphragm apparatus.

FIGS. 11 to 13 show an embodiment of a diaphragm apparatus according to the present invention, and like reference numerals denote parts corresponding to those in the embodiment of the shutter apparatus described above for ready understanding. FIG. 11 is a typical plan view showing the present diaphragm apparatus seen from the lower side of the substrate (diaphragm blade side). The rotor 2a is held at the intermediate position by the elastic member 5. At this time, a pair of diaphragm blades 30 and 40 coupled with the operating pin 2 of the rotor 2a regulate the diameter of the lens aperture 1o. Specifically, an opening 31 formed in one diaphragm blade 30 and another opening 41 formed in the other diaphragm blade 40 overlap on the lens aperture 1o to effect predetermined aperture regulation. FIG. 12 shows the state in which the rotor 2a is held at the one end position, and the attractive force caused by a magnetic member (not shown) attached to the coil frame overcomes the elastic force of the elastic member 5 so that the rotor 2a is self-regulated at the one end position. At this time, the pair of the diaphragm blades 30 and 40 coupled with the operating pin 2b of the rotor 2a are retracted from the lens aperture 10 to both of the sides, thereby obtaining the maximum aperture. On the contrary, FIG. 13 shows the state in which the rotor 2a is self-regulated at the other end position. The pair of diaphragm blades 30 and 40 coupled with the operating pin 2b partially overlap on the lens aperture 1o to set the medium aperture. Specifically, an opening 32 formed in the diaphragm blade 30 and another opening 42 formed in the diaphragm blade 40 overlap on the lens aperture 1o to set the medium aperture between the maximum aperture shown in FIG. 12 and the minimum aperture shown in FIG. 11. In this manner, the pair of the diaphragm blades 30 and 40 can be set at three points at which the diameter of the lens aperture 1o can be set to be large, medium and small, respectively, in accordance with the three points (the intermediate position, the one end position and the other end position) of the rotor which can be held by the auto-retaining means provided to the electromagnetic actuator 2.

Figure 14:
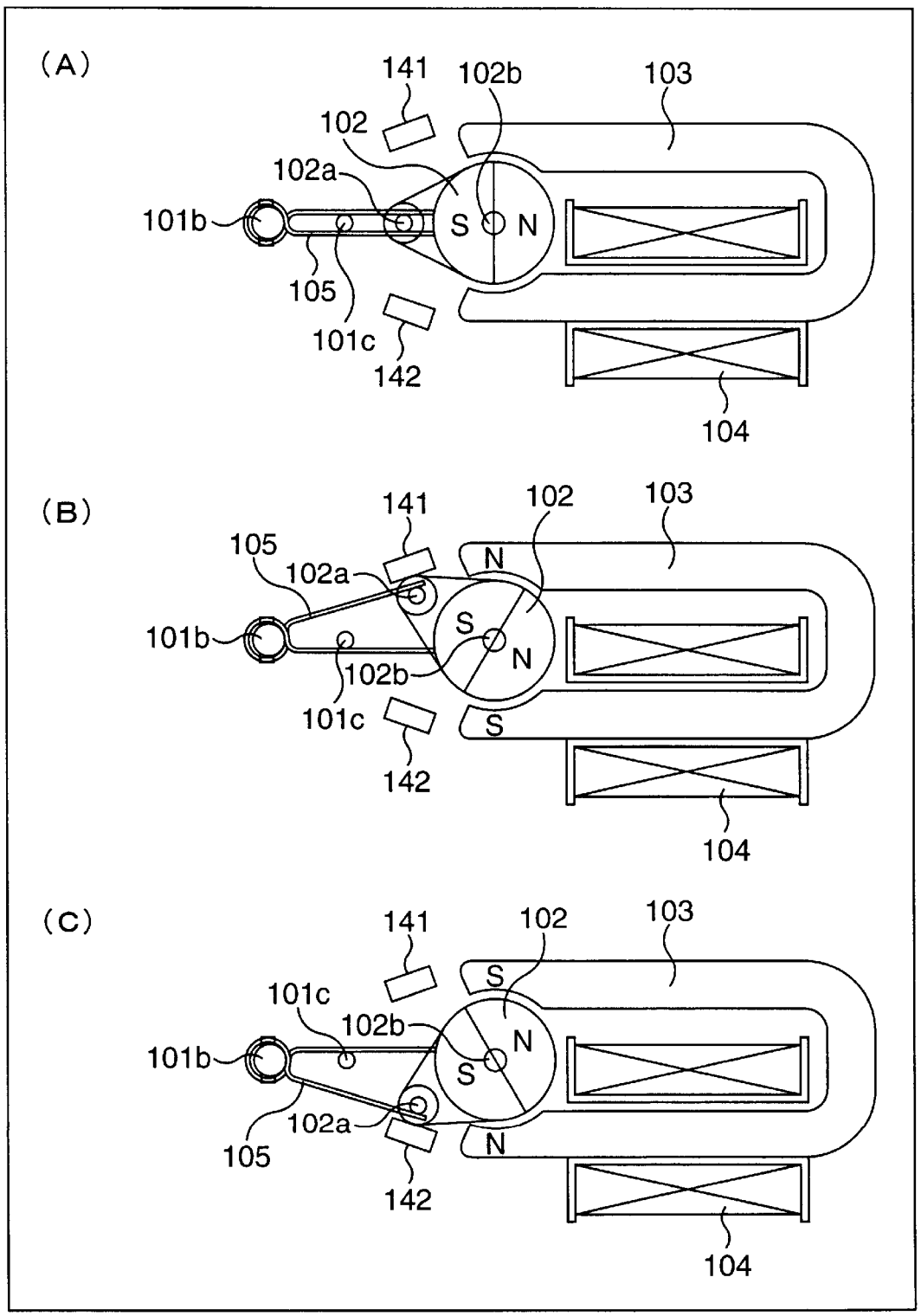
FIG. 14 is a schematic diagram showing another electromagnetic actuator according to the present invention.

FIG. 14 is a schematic diagram showing structure and operation of an electromagnetic actuator of a step motor type according to the present invention. As shown in part (A), the electromagnetic actuator is constituted by a rotor 102 magnetized in two poles, a horseshoe-like yoke 103 and a coil 104 wound around the yoke 103. The rotor 102 has a rotating shaft 102b and can rotate in both directions between the one end position and the other end position through the intermediate position shown in part (A). In FIG. 14, the one end position is shown in part (B) and the other end position is shown in part (C). When the two-pole rotor 102 is placed at the one end position (B) and the other end position (C), the horseshoe-like yoke 103 is arranged at a position where the magnetic attractive force is created. The coil 104 wound around the yoke 103 rotates the rotor 102 in both directions in accordance with energization from the drive circuit (not shown). As a characteristic feature, the present electromagnetic actuator includes auto-retaining means which retains the two-pole rotor 102 at the intermediate position (A), the one end position (B) and the other end position (C) in the non-energizing state in which the coil 104 is not applied with an electric current. Specifically, the auto-retaining means is made up of: an elastic member 105 for regulating the rotor 102 at the intermediate position (A) by a mechanical elastic force; one stopper member 141 for arresting the rotor 102 at the one end position (B) by utilizing the magnetic attractive force generated between the rotor 102 and the yoke 103; and the other stopper member for arresting the rotor 102 at the other end position (C) by utilizing the magnetic attractive force generated between the rotor 102 and the yoke 103. The elastic member 105 is constituted by a coil spring having a pair of open ends and fixed to a fixing pin 101b implanted to the substrate (not shown). Both of the open ends of the elastic member 105 are engaged with a small diameter portion of the operating pin 102a which integrally rotates with the rotor 102, and retains the rotor 102 at the intermediate position (A) by the predetermined elastic force. It is to be noted that a guide pin 101c is provided between the fixing pin 101b and the operating pin 102a in order to assure the stable operation of the elastic member 105. When the rotor 102 is placed at the one end position (B), one stopper member 141 is brought into contact with a large diameter portion of the operating pin 102a to limit the clockwise rotating of the operating pin 102a so that the rotor 102 is self-regulated. The rotor 102 tries to rotate in the clockwise direction by the attractive force generated between the rotor 102 and the one end portion of the yoke 103 even in the non-energizing state, but the stopper member 141 stops the movement of the rotor 102, thereby causing the rotor 102 to be self-regulated at the illustrated one end position (B). Similarly, when the rotor is set at the other end position (C), the large diameter portion of the operating pin 102a of the rotor 102 is brought into contact with the other stopper member 142 so that the rotor 102 is self-regulated. In this embodiment, when the rotor 102 reaches the intermediate position (A), the elastic force of the elastic member 105 overcomes the magnetic attractive force, and the rotor 102 is regulated at the intermediate position (A). Further, when the rotor 102 reaches the one end position (B), the magnetic attractive force overcomes the elastic force of the elastic member 105, and the rotor 102 is thereby self-regulated at the one end position (B). Similarly, when the rotor 102 reaches the other end position (C), the attractive force between the yoke 103 and the rotor 102 overcomes the elastic force of the elastic member 105 to cause the rotor 102 to be self-regulated at the other one end position (C). In this case, an amount of energization of the coil 104 required for driving the rotor 102 from the intermediate position (A) to the one end position (B) or the other end position (C) is larger than that required for driving the rotor 102 from the one end position or the other end position to the intermediate position (A).

According to the present invention, in both of the limits (the one end position and the other end position) of the operating angle range of the rotor 102, arrangement is made in such a manner that the magnetic attractive force is generated between the two-pole rotor 102 and the horseshoe-like yoke 103 in the non-energizing state. The elastic member 105 is provided precisely at the intermediate position in the operating angle range of the rotor 102 such that the operating pin 102 which integrally rotates with the rotor 102 is held. At both of the limits of the operating angle range of the rotor 102, auto-retaining is performed by the attractive force between the yoke 103 and the two-pole rotor 102. Moreover, at the intermediate position of the operating angle range, that position can be held by the elastic force of the elastic member 105. In order to operate the rotor 102 from the one end position or the other end position to the intermediate position, the coil 104 wound around the yoke 103 is energized. The energization time or the application of a drive voltage to the coil 104 can be controlled and the braking energization can be performed in order to stop the rotor 102 precisely at the intermediate position from the one end position or the other end position.

The operation of the electromagnetic actuator according to the present invention will be described with reference to FIG. 14. The initial state is shown in part (A) where the rotor 102 is held just in the middle of the operating angle range. In this state, when the coil 104 is energized in the forward direction, an N pole is generated at one end of the yoke 103 as shown in part (B), and the rotor 102 rotates in the clockwise direction by the magnetic force and comes into contact with the stopper member 141 to be stopped. As described above, even if energization of the coil 104 is interrupted in this state, this state can be held by the attractive force created between the two-pole rotor 102 and the yoke 103. Subsequently, when the coil 104 is energized in the reverse direction from the state shown in part (B), an S pole is generated at one end of the yoke 103 as shown in part (C), and an N pole is produced at the other end of the yoke 103. As a result, the two-pole rotor 102 rotates in the counterclockwise direction. At this time, application of the braking voltage is possible by controlling the energization time and switching the energization to the reverse polarity or by controlling the application of voltage after elapse of a predetermined time, and the rotor 102 can be stopped at the intermediate position shown in part (A). Since this state is the same as the initial state, that position can be maintained without energization. In addition, energization in the reverse direction from the initial state shown in part (A) can cause the rotor 102 to rotate in the counterclockwise direction to be shifted to the other end position illustrated in part (C). The fact that the rotor 102 can be self-regulated even if energization is interrupted in this state is the same as the case shown in part (B). By executing energization in the forward direction during the operation from the state depicted in part (C), the rotor 102 can return to the initial state shown in part (A).

Figure 15:
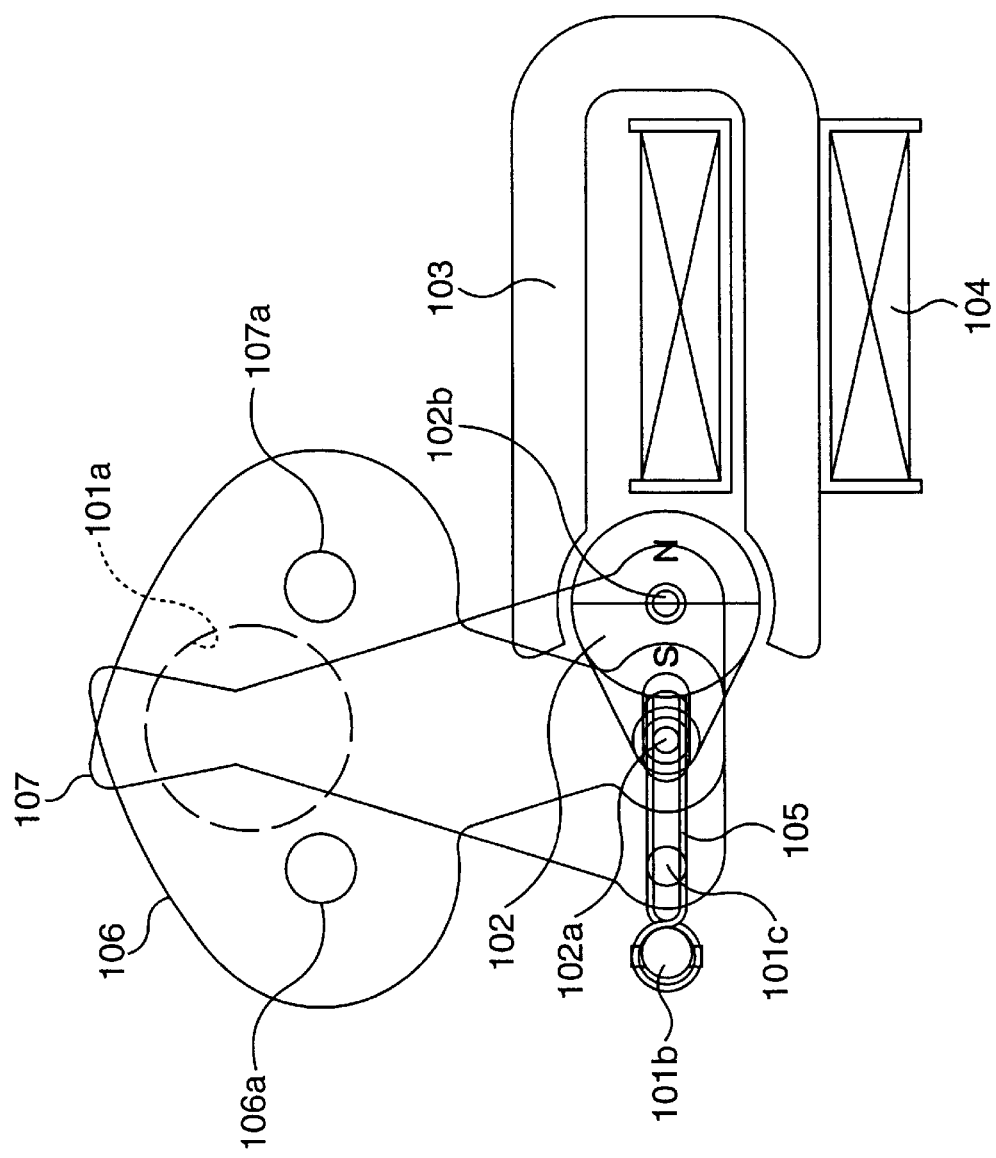
FIG. 15 is a plan view showing a third embodiment of a shutter apparatus according to the present invention.
Figure 16:
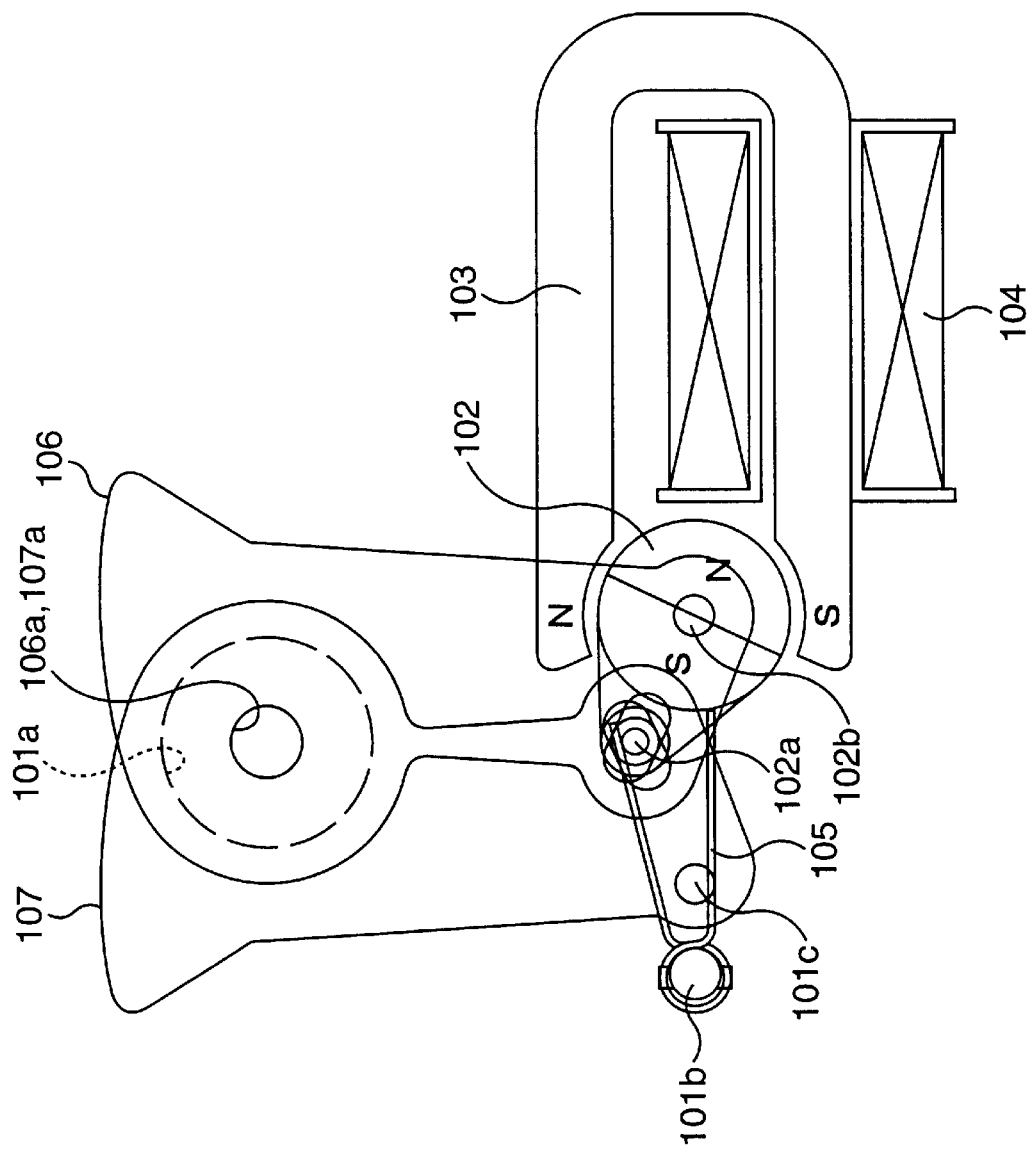
FIG. 16 is a plan view showing the third embodiment of the shutter apparatus according to the present invention.
Figure 17:
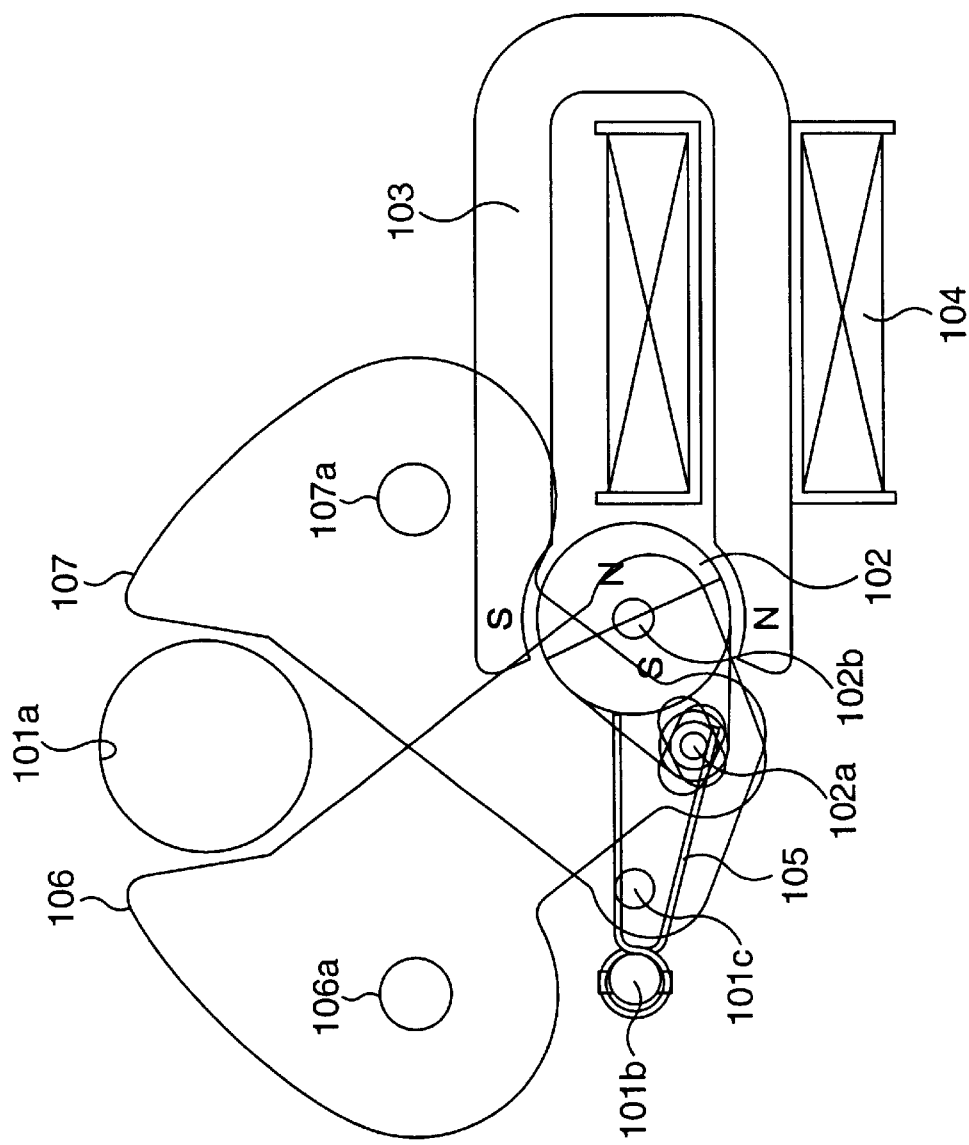
FIG. 17 is a plan view showing the third embodiment of the shutter apparatus according to the present invention.

With reference to FIGS. 15 to 17, description will now be given as to a third embodiment of the shutter apparatus in which the electromagnetic actuator shown in FIG. 14 is incorporated. FIG. 15 typically shows the state in which the rotor 102 of the electromagnetic actuator is set at the intermediate position. This shutter apparatus is assembled by using the substrate (not shown). The electromagnetic actuator is positioned on the upper face side of the substrate, and a regulation member pair of shutter blades 106 and 107 coupled with the electromagnetic actuator are arranged on the lower face side of the substrate. The operating pin 102a which integrally moves with the rotor 102 pierces through the substrate from the upper face side to the lower face side, and engages with each long hole formed in the shutter blades 106 and 107. One shutter blade 106 is so mounted as to be capable of rotating around a pin implanted on the lower face side of the substrate. This pin is positioned on the side opposed to a rotor shaft 102b arranged on the upper face side of the substrate. Similarly, the other shutter blade 107 is so mounted as to be capable of rotating around a pin implanted on the lower face side of the substrate. This pin is provided at the substantially same position as a guide pin 101c implanted on the upper face side of the substrate.

A lens aperture 101a is formed in the substrate. When the rotor 102 is set at the intermediate position shown in the drawing, the shutter blades 106 and 107 which interlock with the rotor 102 through the operating pin 102a are at the full closing position where the lens aperture 101a is completely closed.

When the coil 104 is energized in the forward direction from this full closing position, the rotor 102 travels to the one end position to be self-regulated as shown in FIG. 16. When the rotor 102 is set at the one end position, the shutter blades 106 and 107 which are linked to the rotor 102 rotate so as to move closer to each other, and an opening 106 formed in one shutter blade 106 and an opening 107a formed in the other shutter blade 107 overlap precisely on the lens aperture 101a. As a result, the lens aperture 101a is partially opened by the pair of the shutter blades 106 and 107 and enters the half opening state.

On the contrary, when the coil 104 is energized in the reverse direction from the state shown in FIG. 15, the rotor 102 rotates in the counterclockwise direction and reaches the other end position depicted in FIG. 17 to be self-regulated. The pair of the shutter blades 106 and 107 which interlock with the rotor 102 travel in the opposed directions and completely open the lens aperture 101a, thereby obtaining the full opening state.

As described above, in the present shutter apparatus, the pair of the shutter blades 106 and 107 can shift to the three points, i.e., the full opening position for opening the lens aperture 101a, the full closing position for closing the lens aperture 101a and the half opening position for partially opening the lens aperture 101a in accordance with the three points of the rotor 102 which can be held by the auto-retaining means of the electromagnetic actuator. Particularly, in this embodiment, the pair of the shutter blades 106 and 107 are set at the half opening position (FIG. 16) in connection with the one end position of the rotor 102, the full closing position (FIG. 15) in connection with the intermediate position of the rotor 102 and the full opening position (FIG. 17) in connection with the other end position of the rotor 102. When the shutter apparatus performing such an operation is incorporated in a digital still camera, after being set at the full closing position of FIG. 15, the shutter blades 106 and 107 are selectively set at the half opening position of FIG. 16 or the full opening position of FIG. 17 in accordance with the brightness information of an object. Thereafter, the shutter blades 106 and 107 are returned from the full opening position or the half opening position to the full closing position shown in FIG. 15 in accordance with turning on the release button. In addition, when the present shutter apparatus is incorporated in the regular still camera, one of the half opening state of FIG. 16 and the full opening state of FIG. 17 is selected in accordance with the brightness information of an object in advance. When the shutter release button is turned on, energization to the coil 104 is controlled so that the pair of shutter blades 106 and 107 are caused to travel from the full closing position of FIG. 15 to the previously selected half opening position of FIG. 16 or full opening position of FIG. 17. Further, energization is changed over in order to return the shutter blades from the half opening position or the full opening position to the full closing position. With the above-described procedure, one exposure operation is completed.

Figure 18:
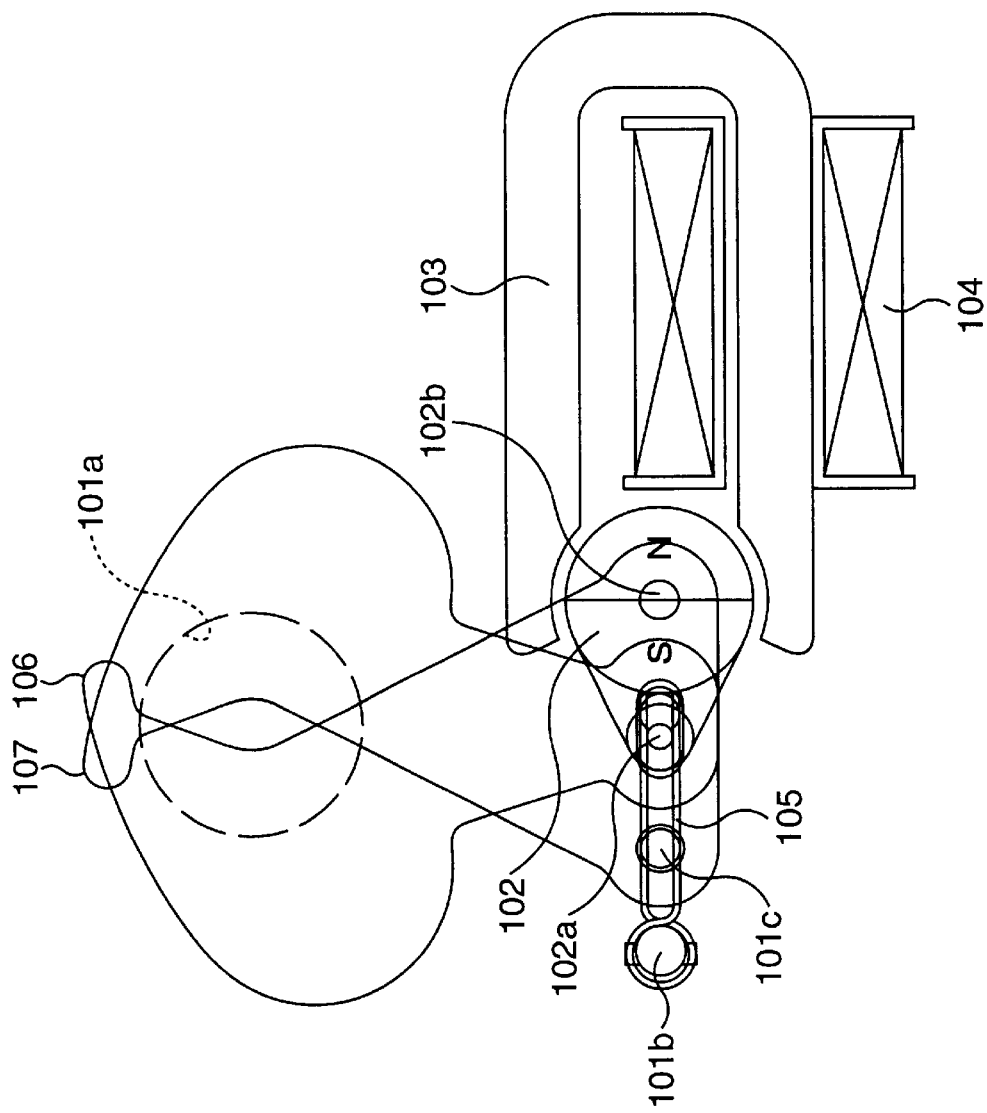
FIG. 18 is a plan view showing a fourth embodiment of a shutter apparatus according to the present invention.
Figure 19:
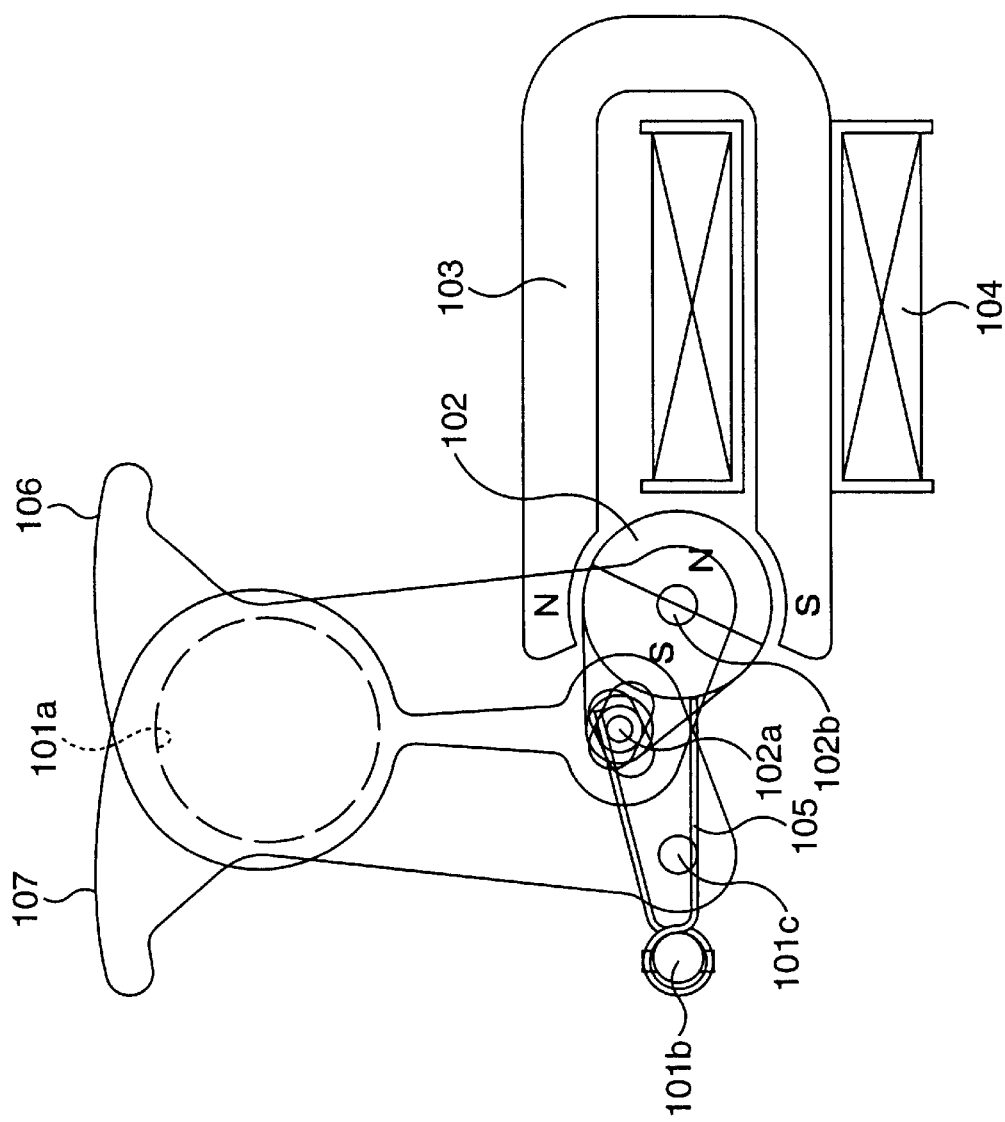
FIG. 19 is a plan view showing the fourth embodiment of the shutter apparatus according to the present invention.
Figure 20:
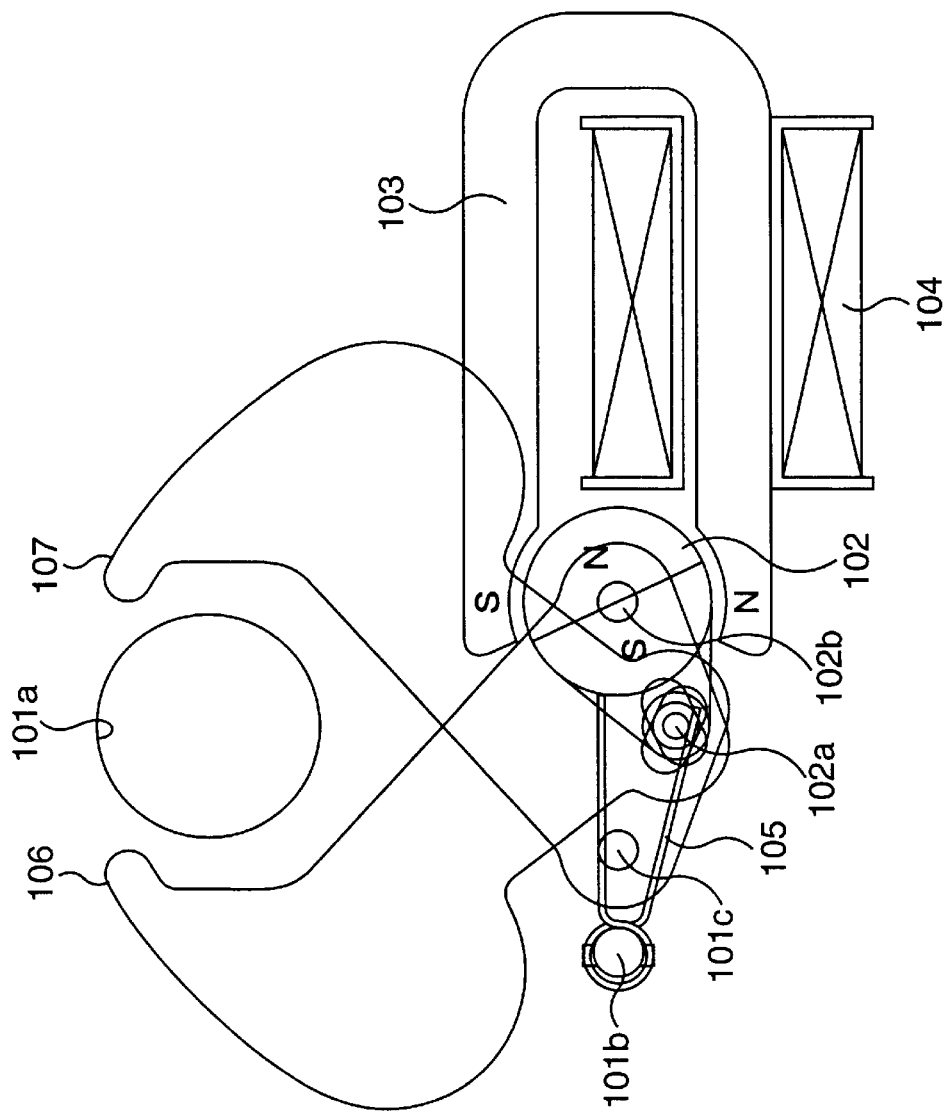
FIG. 20 is a plan view showing the fourth embodiment of the shutter apparatus according to the present invention.

As mentioned above, according to this embodiment, in the non-energizing state at the three points, the intermediate position is associated with the full closing position; the one end position (initial point) is associated with the half opening position; and the other end position (end point) is associated with the full opening position. In a digital still camera, since the shutter blade is set at the full opening position or the half opening position in advance, the shutter blade may be possibly operated to overrun from the initial point to the end point without being stopped at the intermediate point when the current flowing through the coil of the electromagnetic actuator is excessively increased. In order to avoid such erroneous operation, complicated electrical control is required. Moreover, when switching between the half opening state and the full opening state in accordance with the brightness of an object under the through condition of the digital still camera, the shutter blade must pass the full closing state, and complicated control for the operation is required. Therefore, FIGS. 18 to 20 show a fourth embodiment aiming at simplification of the above-described control. In general terms, the shutter blade in the fourth embodiment is placed at the full closing position in accordance with the one end position (initial point) of the rotor; the half opening position in accordance with the intermediate position (intermediate point); and the full opening position in accordance with the other end position (end point) of the rotor. Since the shutter blade is so set as to be fully opened at the end point and to be half opened at the intermediate point, the maximum current allowed by rating can flow through the coil to switch from each of the opening state to the full closing state at the initial point. Therefore, the closing time of the shutter blade can be shortened as compared with the third embodiment. In addition, changeover between the full opening position and the half opening position is possible without passing the full closing position in the through state. In any case, the control can be simplified.

Referring to FIG. 18, since the rotor 102 is set at the intermediate position and the pair of the shutter blades 106 and 107 which interlock with the rotor 102 are set at a position for partially closing the lens aperture 101a, they are set at the half opening position. In the state shown in FIG. 19, the rotor 102 is self-regulated at the one end position, and the pair of the shutter blades 106 and 107 interlocking with the rotor 102 overlap each other to completely close the lens aperture 101a. Therefore, the shutter blades 106 and 107 are set at the full closing position. In the state shown in FIG. 20, the rotor 102 is self-regulated at the other end position, and the pair of the shutter blades 106 and 107 interlocking with the rotor 102 are retracted from the lens aperture 101a on the respective sides opposed to each other. As a result, the shutter blades 106 and 107 are set at the full opening position. In case of operating the shutter apparatus having such a configuration, the half opening state at the intermediate position is changed to the full closing state by the clockwise rotation in a digital still camera. When setting to the full opening state, energization is performed in the reverse direction to cause the counterclockwise rotation of the rotor. Retention in the non-energizing state is enabled in the full opening state and the half opening state, and the operation for switching to the full closing state is possible by performing energization with the maximum rated current from the aforesaid states.

Figure 21:
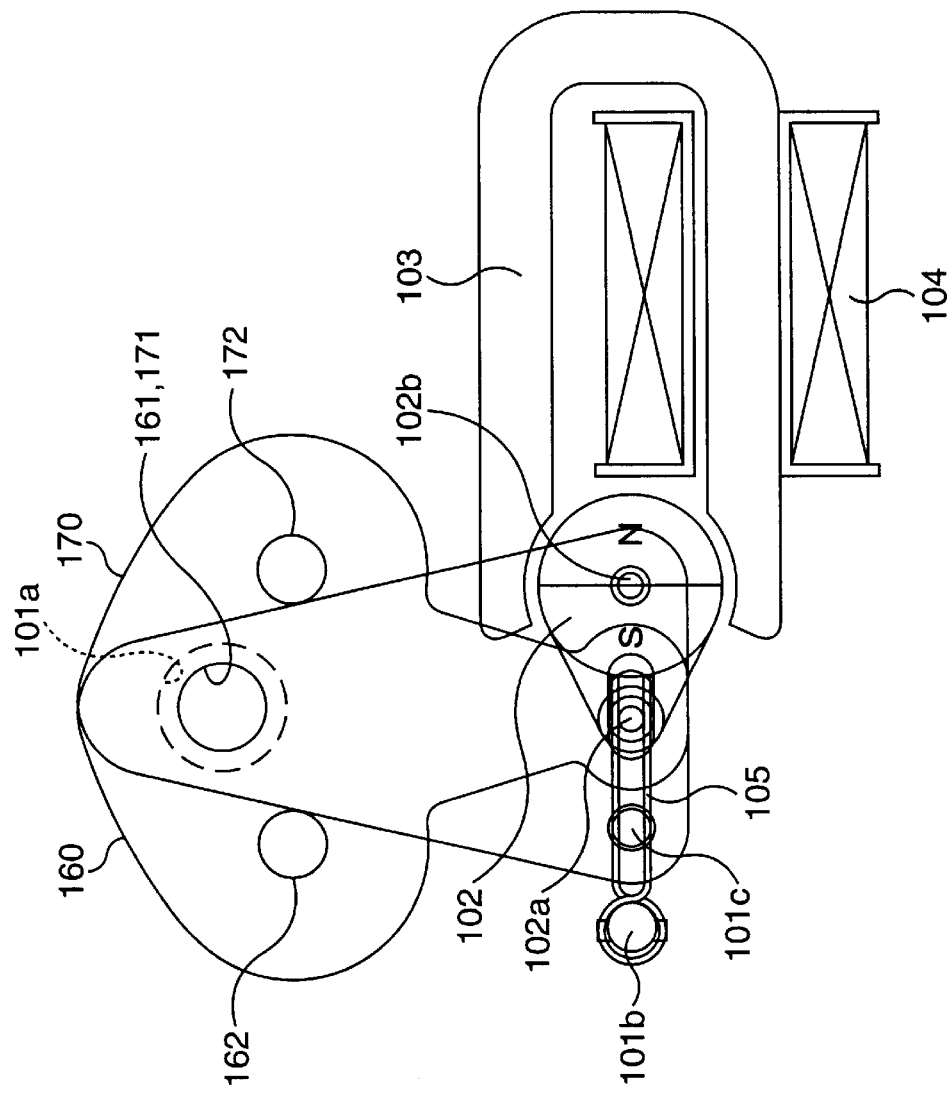
FIG. 21 is a plan view showing another embodiment of the diaphragm apparatus according to the present invention.
Figure 22:
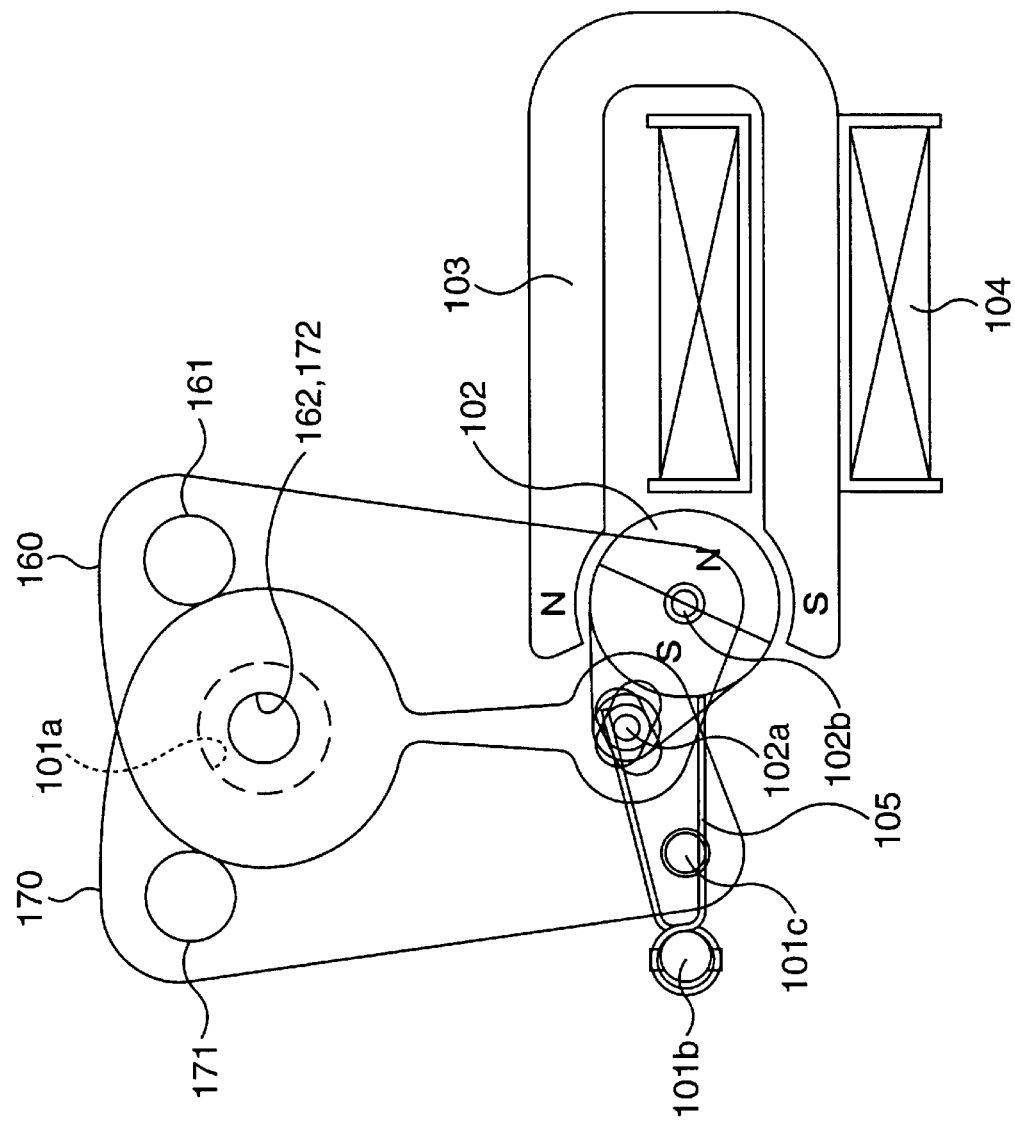
FIG. 22 is a plan view showing still another embodiment of the diaphragm apparatus according to the present invention.
Figure 23:
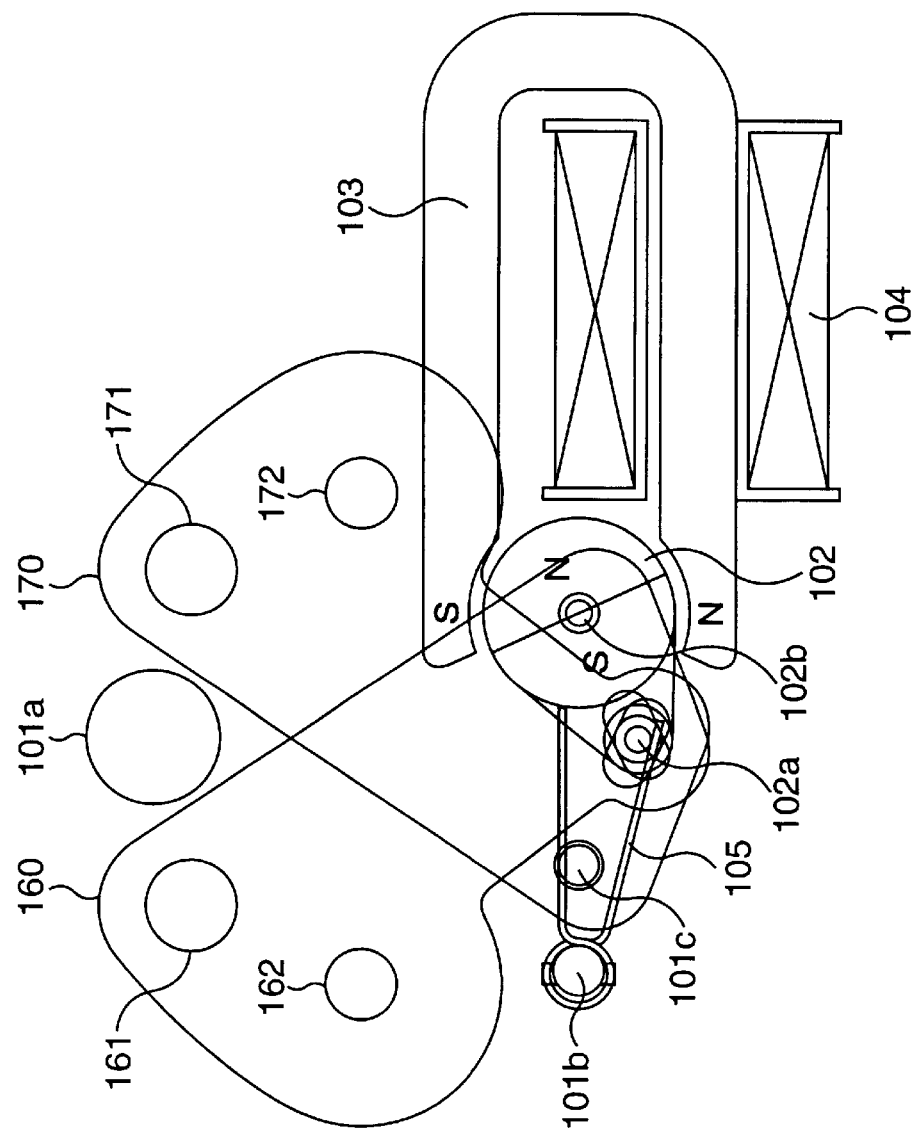
FIG. 23 is a plan view showing yet another embodiment of the diaphragm apparatus according to the present invention.

FIGS. 21 to 23 are typical plan view showing another embodiment of the diaphragm apparatus in which the electromagnetic actuator is incorporated according to the present invention. The basic structure is similar to the embodiment of the shutter apparatus described above, and like reference numerals denote like or corresponding parts for ready understanding. In FIG. 21, the rotor 102 is self-regulated at the intermediate position, and a pair of diaphragm blades 160 and 170 interlocking with the rotor 102 are set such that the diameter of the lens aperture 101a has a medium size. Specifically, a first opening 161 formed in one diaphragm blade 160 and a first aperture 171 formed in the other diaphragm blade 170 overlap precisely on the lens aperture 101a, and the aperture has the medium diameter. In the state shown in FIG. 22, the rotor 102 is self-regulated at the one end position, and the diaphragm blades 160 and 170 interlocking with the rotor 102 are set in such a manner that the diameter of the lens aperture 101a has a minimum size. Specifically, a second opening 162 formed in the diaphragm blade 160 and a second opening 172 formed in the diaphragm blade 170 overlap precisely on the lens aperture 101a. Since the diameter of the openings 162 and 172 is smaller than that of the openings 161 and 171, the aperture has a minimum diameter. In the state shown in FIG. 23, the rotor 102 is self-regulated at the other end position, and the pair of the diaphragm blades 160 and 170 interlocking with the rotor 102 are retreated from the lens aperture 101a toward both sides. Since the lens aperture 101a is not narrowed, it has the maximum aperture. As described above, the diaphragm blades 160 and 170 can be set at the three points, at which the diameter of the lens aperture can be regulated to be large, medium and small, in accordance with the three points of the rotor 102 which can be held by the auto-retaining means.

As mentioned above, according to the present invention, the electromagnetic actuator can be self-regulated at the three points by utilizing the elastic force of the elastic member and the attractive force of the magnetic member, and incorporating such an electromagnetic actuator in the shutter apparatus can realize the shutter for a camera having two apertures. Additionally, if the electromagnetic actuator is incorporated in a diaphragm apparatus, the three-stage aperture control can be obtained by one actuator.

What is claimed is:

1. An electromagnetic actuator comprising:
   a rotor that is comprised of a permanent magnet and that is rotatable in two directions between a first end position and a second end position via an intermediate position;
   a coil that is wound around the rotor and that rotates the rotor in an energizing state where an electric current is applied to the coil; and
   auto-retaining means for retaining the rotor at one of the intermediate position, the first end position and the second end position under a non-energizing state where the electric current is not applied to the coil, wherein
   the auto-retaining means comprises an elastic member that regulates the rotor at the intermediate position by a mechanical elastic force, a first magnetic member that is opposed to the permanent magnet and that retains the rotor at the first end position by a magnetic attractive force, and a second magnetic member that is opposed to the permanent magnet and that retains the rotor at the second end position by a magnetic attractive force.

2. The electromagnetic actuator according to claim 1, wherein the auto-retaining means is designed such that the mechanical elastic force overcomes the magnetic attractive force so as to regulate the rotor at the intermediate position when the coil is switched from the energizing state to the non-energizing state while the rotor travels toward the intermediate position, further the auto-retaining means is designed such that the magnetic attractive force overcomes the mechanical elastic force so as to retain the rotor at the first end position when the coil is switched from the energizing state to the non-energizing state while the rotor travels toward the first end position, and the auto-retaining means is designed such that the magnetic attractive force overcomes the mechanical elastic force so as to retain the rotor at the second end position when the coil is switched from the energizing state to the non-energizing state while the rotor travels toward the second end position.

3. The electromagnetic actuator according to claim 1, wherein the coil is provided such that an amount of the electric current required for driving the rotor from the intermediate position to either of the first end position and the second end position is greater than another amount of the electric current required for driving the rotor from either of the first end position and the second end position to the intermediate position.

4. A shutter apparatus comprising: a shutter blade that is arranged on a substrate having an aperture and that opens and closes the aperture; and an electromagnetic actuator that is engaged with the shutter blade and that drives the shutter blade to open and close the aperture, wherein the electromagnetic actuator comprises a rotor that is composed of a permanent magnet and that is rotatable in two directions between a first end position and a second end position via an intermediate position, a coil that is wound around the rotor and that rotates the rotor in an energizing state where an electric current is applied to the coil, and auto-retaining means for retaining the rotor at one of three positions selected from the intermediate position, the first end position and the second end position under a non-energizing state where the electric current is not applied to the coil, the auto-retaining means comprising an elastic member that regulates the rotor at the intermediate position by a mechanical elastic force, a first magnetic member that is opposed to the permanent magnet and that retains the rotor at the first end position by a magnetic attractive force, and a second magnetic member that is opposed to the permanent magnet and that retains the rotor at the second end position by a magnetic attractive force, and wherein the shutter blade is driven to one of three positions selected from a full opening position for opening the aperture, a full closing position for closing the aperture, and a half opening position for partially opening the aperture, the three positions of the shutter blade corresponding to the three positions of the rotor.

5. The shutter apparatus according to claim 4, wherein the shutter blade is selectively driven to one of the full opening position in correspondence to the first end position of the rotor, the full closing position in correspondence to the intermediate position of the rotor, and the half opening position in correspondence to the second end position of the rotor.

6. The shutter apparatus according to claim 4, wherein the shutter blade is selectively driven to one of the full opening position in correspondence to the first end position of the rotor, the half opening position in correspondence to the intermediate position of the rotor, and the full closing position in correspondence to the second end position of the rotor.

7. A diaphragm apparatus comprising: a diaphragm blade that is arranged on a substrate having an aperture and that regulates a diameter of the aperture; and an electromagnetic actuator that is engaged with the diaphragm blade to drive the diaphragm blade, wherein the electromagnetic actuator comprises a rotor that is composed of a permanent magnet and that is rotatable in two directions between a first end position and a second end position via an intermediate position, a coil that is wound around the rotor and that rotates the rotor in an energizing state where an electric current is applied to the coil, and auto-retaining means for retaining the rotor at one of three positions selected from the intermediate position, the first end position and the second end position under a non-energizing state where the electric current is not applied to the coil, the auto-retaining means comprising an elastic member that regulates the rotor at the intermediate position by a mechanical elastic force, a first magnetic member that is opposed to the permanent magnet and that retains the rotor at the first end position by a magnetic attractive force, and a second magnetic member that is opposed to the permanent magnet and that retains the rotor at the second end position by a magnetic attractive force, and wherein the diaphragm blade is driven selectively to three positions for setting the aperture in a large diameter, a medium diameter and a small diameter, respectively, the three positions of the diaphragm blade corresponding to the three positions of the rotor.

8. An electromagnetic actuator comprising:

a rotor that is magnetized in two poles and that is rotatable in two directions between a first end position and a second end position via an intermediate position;

a yoke that has a horseshoe-like shape and that is arranged relative to the rotor such that a magnetic attractive force is created when the rotor comes to either of the first end position and the second end position;

a coil that is wound around the yoke and that rotates the rotor in an energizing state where an electric current is applied to the coil; and auto-retaining means for retaining the rotor at one of the intermediate position, the first end position and the second end position under a non-energizing state where the electric current is not applied to the coil, wherein the auto-retaining means comprises an elastic member that regulates the rotor at the intermediate position by a mechanical elastic force, a first stopper member that arrests the rotor at the first end position by utilizing the magnetic attractive force created between the rotor and the yoke, and a second stopper member that arrests the rotor at the second end position by utilizing the magnetic attractive force created between the rotor and the yoke.

9. The electromagnetic actuator according to claim 8, wherein the auto-retaining means is designed such that the mechanical elastic force overcomes the magnetic attractive force so as to regulate the rotor at the intermediate position when the coil is switched from the energizing state to the non-energizing state while the rotor travels toward the intermediate position, further the auto-retaining means is designed such that the magnetic attractive force overcomes the mechanical elastic force so as to arrest the rotor at the first end position when the coil is switched from the energizing state to the non-energizing state while the rotor travels toward the first end position, and the auto-retaining means is designed such that the magnetic attractive force overcomes the mechanical elastic force so as to arrest the rotor at the second end position when the coil is switched from the energizing state to the non-energizing state while the rotor travels toward the second end position.

10. The electromagnetic actuator according to claim 8, wherein the coil is provided such that an amount of the electric current required for driving the rotor from the intermediate position to either of the first end position and the second end position is greater than another amount of the electric current required for driving the rotor from either of the first end position and the second end position to the intermediate position.

11. A shutter apparatus comprising: a shutter blade that is arranged on a substrate having an aperture and that opens and closes the aperture; and an electromagnetic actuator that is engaged with the shutter blade and that drives the shutter blade to open and close the aperture, wherein the electromagnetic actuator comprises a rotor that is magnetized in two poles and that is rotatable in two directions between a first end position and a second end position via an intermediate position, a yoke that has a horseshoe-like shape and that is arranged relative to the rotor such that a magnetic attractive force is created when the rotor comes to either of the first end position and the second end position, a coil that is wound around the yoke and that rotates the rotor in an energizing state where an electric current is applied to the coil, and auto-retaining means for retaining the rotor at one of three positions selected from the intermediate position, the first end position and the second end position under a non-energizing state where the electric current is not applied to the coil, the auto-retaining means comprising an elastic member that regulates the rotor at the intermediate position by a mechanical elastic force, a first stopper member that arrests the rotor at the first end position by utilizing the magnetic attractive force created between the rotor and the yoke, and a second stopper member that arrests the rotor at the second end position by utilizing the magnetic attractive force created between the rotor and the yoke, and wherein the shutter blade is driven to one of three positions selected from a full opening position for opening the aperture, a full closing position for closing the aperture, and a half opening position for partially opening the aperture, the three positions of the shutter blade corresponding to the three positions of the rotor.

12. The shutter apparatus according to claim 11, wherein the shutter blade is selectively driven to one of the full opening position in correspondence to the first end position of the rotor, the full closing position in correspondence to the intermediate position of the rotor, and the half opening position in correspondence to the second end position of the rotor.

13. The shutter apparatus according to claim 11, wherein the shutter blade is selectively driven to one of the full opening position in correspondence to the first end position of the rotor, the half opening position in correspondence to the intermediate position of the rotor, and the full closing position in correspondence to the second end position of the rotor.

14. A diaphragm apparatus comprising: a diaphragm blade that is arranged on a substrate having an aperture and that regulates a diameter of the aperture; and an electromagnetic actuator that is engaged with the diaphragm blade to drive the diaphragm blade, wherein the electromagnetic actuator comprises a rotor that is magnetized in two poles and that is rotatable in two directions between a first end position and a second end position via an intermediate position, a yoke that has a horseshoe-like shape and that is arranged relative to the rotor such that a magnetic attractive force is created when the rotor comes to either of the first end position and the second end position, a coil that is wound around the yoke and that rotates the rotor in an energizing state where an electric current is applied to the coil, and auto-retaining means for retaining the rotor at one of three positions selected from the intermediate position, the first end position and the second end position under a non-energizing state where the electric current is not applied to the coil, the auto-retaining means comprising an elastic member that regulates the rotor at the intermediate position by a mechanical elastic force, a first stopper member that arrests the rotor at the first end position by utilizing the magnetic attractive force created between the rotor and the yoke, and a second stopper member that arrests the rotor at the second end position by utilizing the magnetic attractive force created between the rotor and the yoke, and wherein the diaphragm blade is driven selectively to three positions for setting the aperture in a large diameter, a medium diameter and a small diameter, respectively, the three positions of the diaphragm blade corresponding to the three positions of the rotor.

15. A camera blade apparatus comprising: a blade that is arranged on a substrate having an aperture and that is driven to regulate a diameter of the aperture; and an electromagnetic actuator that is engaged with the blade to drive the blade, wherein the electromagnetic actuator comprises a rotor that is composed of a permanent magnet and that is rotatable in two directions between a first end position and a second end position via an intermediate position, a yoke that is disposed around the rotor, a coil that is arranged on the yoke and that rotates the rotor in an energizing state where an electric current is applied to the coil, and auto-retaining means for retaining the rotor at one of three positions selected from the intermediate position, the first end position and the second end position under a non-energizing state where the electric current is not applied to the coil, the auto-retaining means comprising an elastic member that regulates the rotor at the intermediate position by a mechanical elastic force, a first regulating member that retains the rotor at the first end position by a magnetic attractive force created between the rotor and the first regulating member, and a second regulating member that retains the rotor at the second end position by a magnetic attractive force created between the rotor and the second regulating member.

* * * * *